United States Patent
Husband et al.

(10) Patent No.: US 11,377,791 B2
(45) Date of Patent: Jul. 5, 2022

(54) PAPER FILLER COMPOSITION

(71) Applicant: FiberLean Technologies Limited, Par (GB)

(72) Inventors: John Claude Husband, St. Austell (GB); Per Svending, Kungalv (SE); David Robert Skuse, Truro (GB); Tafadzwa Motsi, Par (GB); Mikko Likitalo, Waterloo (BE); Alan Coles, Falmouth (GB)

(73) Assignee: FiberLean Technologies Limited, Par (GB)

( * ) Notice: Subject to any disclaimer, the term of this patent is extended or adjusted under 35 U.S.C. 154(b) by 0 days.

(21) Appl. No.: 16/117,685

(22) Filed: Aug. 30, 2018

(65) Prior Publication Data

US 2018/0371694 A1    Dec. 27, 2018

Related U.S. Application Data

(60) Division of application No. 14/843,516, filed on Sep. 2, 2015, now Pat. No. 10,100,464, which is a
(Continued)

(30) Foreign Application Priority Data

May 15, 2009    (GB) ..................... 0908401

(51) Int. Cl.
    D21H 11/18    (2006.01)
    D21C 9/00     (2006.01)
    (Continued)

(52) U.S. Cl.
    CPC ............. D21C 9/007 (2013.01); D21B 1/30 (2013.01); D21C 9/001 (2013.01); D21D 1/20 (2013.01);
    (Continued)

(58) Field of Classification Search
    CPC ..................................... D21H 11/18
    See application file for complete search history.

(56) References Cited

U.S. PATENT DOCUMENTS

| 57,307 A  | 8/1866  | Fletcher |
| 168,783 A | 10/1875 | Riley    |

(Continued)

FOREIGN PATENT DOCUMENTS

| BE | 1006908 A3 | 1/1995 |
| CA | 1096676 A  | 3/1981 |

(Continued)

OTHER PUBLICATIONS

European Partial European Search Report of European Patent Application No. 16153032.4-1308, dated May 17, 2016, 7 pages.
(Continued)

*Primary Examiner* — Anthony Calandra
(74) *Attorney, Agent, or Firm* — Raymond G. Arner; Pierce Atwood LLP

(57) ABSTRACT

A method for preparing an aqueous suspension may include providing a fibrous substrate comprising cellulose having a Canadian Standard freeness equal to or less than 450 cm$^3$, and microfibrillating the fibrous substrate in an aqueous environment by grinding in the presence of a grinding medium consisting essentially of mullite. The grinding may be carried out in the absence of grindable inorganic particulate material. The grinding medium may be present in an amount of at least about 10% by volume of the aqueous environment. The microfibrillated cellulose may have a fibre steepness of from about 20 to about 50.

12 Claims, 1 Drawing Sheet

Related U.S. Application Data continuation of application No. 12/994,356, filed as application No. PCT/GB2010/000982 on May 17, 2010, now Pat. No. 9,127,405.

(51) Int. Cl.
  *D21H 15/02* (2006.01)
  *D21D 1/20* (2006.01)
  *D21H 19/38* (2006.01)
  *D21B 1/30* (2006.01)
  *D21H 11/04* (2006.01)
  *D21H 11/20* (2006.01)

(52) U.S. Cl.
  CPC .......... *D21H 5/1236* (2013.01); *D21H 11/04* (2013.01); *D21H 11/18* (2013.01); *D21H 11/20* (2013.01); *D21H 19/38* (2013.01); *D21H 19/385* (2013.01)

(56) References Cited

U.S. PATENT DOCUMENTS

| | | |
|---|---|---|
| 2,006,209 A | 6/1935 | Bradner |
| 3,075,710 A | 1/1963 | Feld et al. |
| 3,765,921 A | 10/1973 | Puskar |
| 3,794,558 A | 2/1974 | Back |
| 3,820,548 A | 6/1974 | Buchmann et al. |
| 3,921,581 A | 11/1975 | Brewer |
| 4,026,762 A | 5/1977 | Bauman |
| 4,087,317 A | 5/1978 | Roberts |
| 4,167,548 A | 9/1979 | Arduini et al. |
| 4,229,250 A | 10/1980 | Lehtinen |
| 4,275,084 A | 6/1981 | Ohyabu et al. |
| 4,285,842 A | 8/1981 | Herr |
| 4,318,959 A | 3/1982 | Evans et al. |
| 4,341,807 A | 7/1982 | Turbak et al. |
| 4,356,060 A | 10/1982 | Neckermann et al. |
| 4,374,702 A | 2/1983 | Turbak et al. |
| 4,378,381 A | 3/1983 | Turbak et al. |
| 4,452,721 A | 6/1984 | Turbak et al. |
| 4,452,722 A | 6/1984 | Turbak et al. |
| 4,460,737 A | 7/1984 | Evans et al. |
| 4,464,287 A | 8/1984 | Turbak et al. |
| 4,474,949 A | 10/1984 | Chatterjee et al. |
| 4,481,076 A | 11/1984 | Herrick |
| 4,481,077 A | 11/1984 | Herrick |
| 4,487,634 A | 12/1984 | Turbak et al. |
| 4,500,546 A | 2/1985 | Turbak et al. |
| 4,510,020 A | 4/1985 | Green et al. |
| 4,705,712 A | 11/1987 | Cashaw et al. |
| 4,744,987 A | 5/1988 | Mehra et al. |
| 4,761,203 A | 8/1988 | Vinson |
| 4,820,813 A | 4/1989 | Schulz |
| 4,889,594 A | 12/1989 | Gavelin |
| 4,952,278 A | 8/1990 | Gregory et al. |
| 5,009,886 A | 4/1991 | Ahmad et al. |
| 5,098,520 A | 3/1992 | Begala |
| 5,104,411 A | 4/1992 | Makoui et al. |
| 5,123,962 A | 6/1992 | Komuro et al. |
| 5,223,090 A | 6/1993 | Klungness et al. |
| 5,225,041 A | 7/1993 | Richard et al. |
| 5,227,024 A | 7/1993 | Gomez |
| 5,228,900 A | 7/1993 | Stephens et al. |
| 5,240,561 A | 8/1993 | Kaliski |
| 5,244,542 A | 9/1993 | Bown et al. |
| 5,269,470 A | 12/1993 | Ishikawa et al. |
| 5,274,199 A | 12/1993 | Uryu et al. |
| 5,279,663 A | 1/1994 | Kaliski |
| 5,312,484 A | 5/1994 | Kaliski |
| 5,316,621 A | 5/1994 | Kitao et al. |
| 5,385,640 A | 1/1995 | Weibel et al. |
| 5,443,902 A | 8/1995 | Knox et al. |
| 5,576,617 A | 11/1996 | Webb et al. |
| 5,731,080 A | 3/1998 | Cousin et al. |
| 5,817,381 A | 10/1998 | Chen et al. |
| 5,837,376 A | 11/1998 | Knox et al. |
| 5,840,320 A | 11/1998 | Odom |
| 5,964,983 A | 10/1999 | Dinand et al. |
| 6,037,380 A | 3/2000 | Venables et al. |
| 6,074,524 A | 6/2000 | Wu et al. |
| 6,083,582 A | 7/2000 | Chen et al. |
| 6,102,946 A | 8/2000 | Nigam |
| 6,117,305 A | 9/2000 | Bando et al. |
| 6,117,474 A | 9/2000 | Kamada et al. |
| 6,117,545 A | 9/2000 | Cavaille et al. |
| 6,117,804 A | 9/2000 | Cho |
| 6,132,558 A | 10/2000 | Dyllick-Brenzinger et al. |
| 6,156,118 A | 12/2000 | Silenius |
| 6,159,335 A | 12/2000 | Owens et al. |
| 6,183,596 B1 | 2/2001 | Matsuda et al. |
| 6,202,946 B1 | 3/2001 | Virtanen |
| 6,214,163 B1 | 4/2001 | Matsuda et al. |
| 6,235,150 B1 | 5/2001 | Middleton et al. |
| 6,312,669 B1 | 11/2001 | Cantiani et al. |
| 6,339,898 B1 | 1/2002 | Toye |
| 6,379,594 B1 | 4/2002 | Döpfner et al. |
| 6,436,232 B1 | 8/2002 | Silenius et al. |
| 6,579,410 B1 | 6/2003 | Bleakley et al. |
| 6,604,698 B2 | 8/2003 | Verhoff et al. |
| 6,647,662 B2 | 11/2003 | Toye |
| 6,669,882 B2 | 12/2003 | Seok |
| 6,726,807 B1 | 4/2004 | Mathur |
| 6,787,497 B2 | 9/2004 | Dellve et al. |
| 6,861,081 B2 | 3/2005 | Weibel |
| 7,022,756 B2 | 4/2006 | Singer |
| 7,048,900 B2 | 5/2006 | Mathur et al. |
| 7,083,703 B2 | 8/2006 | Aho et al. |
| 7,169,258 B2 | 1/2007 | Rheims et al. |
| 7,179,347 B2 | 2/2007 | Rheims et al. |
| 7,285,182 B2 | 10/2007 | Mason et al. |
| 7,381,294 B2 | 6/2008 | Suzuki et al. |
| 7,459,493 B2 | 12/2008 | Singer |
| 7,462,232 B2 | 12/2008 | Tuason et al. |
| 7,594,619 B2 | 9/2009 | Ghere, Jr. et al. |
| 7,726,592 B2 | 6/2010 | Fernandez et al. |
| 7,790,276 B2 | 9/2010 | Kanakarajan |
| 7,799,358 B2 | 9/2010 | Weibel |
| 8,012,312 B2 | 9/2011 | Goto et al. |
| 8,361,278 B2 | 1/2013 | Fike et al. |
| 8,728,273 B2 | 5/2014 | Heiskanen et al. |
| 10,669,671 B2 | 6/2020 | Skuse et al. |
| 2001/0011516 A1 | 8/2001 | Cantiani et al. |
| 2002/0031592 A1 | 3/2002 | Weibel |
| 2002/0059886 A1 | 5/2002 | Merkley et al. |
| 2002/0081362 A1 | 6/2002 | Weibel |
| 2002/0198293 A1 | 12/2002 | Craun et al. |
| 2003/0051841 A1 | 3/2003 | Mathur et al. |
| 2003/0094252 A1 | 5/2003 | Sundar et al. |
| 2003/0114641 A1 | 6/2003 | Kelly et al. |
| 2004/0108081 A1 | 6/2004 | Hughes |
| 2004/0146605 A1 | 7/2004 | Weibel |
| 2004/0149403 A1 | 8/2004 | Rheims et al. |
| 2004/0168782 A1 | 9/2004 | Silenius et al. |
| 2004/0168783 A1 | 9/2004 | Munchow |
| 2004/0173329 A1 | 9/2004 | Silenius et al. |
| 2005/0000665 A1 | 1/2005 | Doelle |
| 2005/0045288 A1 | 3/2005 | Riou |
| 2005/0051054 A1 | 3/2005 | White et al. |
| 2005/0089601 A1 | 4/2005 | Weibel |
| 2005/0103459 A1 | 5/2005 | Mathur |
| 2005/0133643 A1 | 6/2005 | Fernandez et al. |
| 2005/0194477 A1 | 9/2005 | Suzuki |
| 2005/0256262 A1 | 11/2005 | Hill et al. |
| 2006/0078647 A1 | 4/2006 | Weibel |
| 2006/0201646 A1 | 9/2006 | Gussinyer Canadell |
| 2006/0266485 A1 | 11/2006 | Knox et al. |
| 2006/0280839 A1 | 12/2006 | Weibel |
| 2006/0289132 A1 | 12/2006 | Heijnesson-Hulten |
| 2007/0062009 A1 | 3/2007 | Ghere, Jr. et al. |
| 2007/0131361 A1 | 6/2007 | Doelle et al. |
| 2007/0148365 A1 | 6/2007 | Knox et al. |
| 2007/0224419 A1 | 9/2007 | Sumnicht et al. |
| 2007/0226919 A1 | 10/2007 | Mheidle |
| 2007/0231568 A1 | 10/2007 | Kanakarajan |

(56) References Cited

U.S. PATENT DOCUMENTS

| | | |
|---|---|---|
| 2007/0272376 A1 | 11/2007 | Maijala et al. |
| 2008/0023161 A1 | 1/2008 | Gather |
| 2008/0057307 A1 | 3/2008 | Koslow et al. |
| 2008/0060774 A1 | 3/2008 | Zuraw et al. |
| 2008/0146701 A1 | 6/2008 | Sain et al. |
| 2008/0210391 A1 | 9/2008 | Pfalzer et al. |
| 2008/0265222 A1 | 10/2008 | Ozersky et al. |
| 2009/0020139 A1 | 1/2009 | Sumnicht et al. |
| 2009/0020248 A1 | 1/2009 | Sumnicht et al. |
| 2009/0065164 A1 | 3/2009 | Goto et al. |
| 2009/0084874 A1 | 4/2009 | Alam et al. |
| 2009/0221812 A1 | 9/2009 | Ankerfors et al. |
| 2010/0059191 A1 | 3/2010 | Garcia Melgarejo et al. |
| 2010/0132901 A1 | 6/2010 | Wild |
| 2010/0139527 A1 | 6/2010 | Fernandez-Garcia |
| 2010/0212850 A1 | 8/2010 | Sumnicht et al. |
| 2011/0088860 A1 | 4/2011 | Heijnesson-Hulten et al. |
| 2011/0114765 A1 | 5/2011 | Brady et al. |
| 2011/0259537 A1 | 10/2011 | Husband et al. |
| 2011/0281487 A1 | 11/2011 | Mukai et al. |
| 2015/0125658 A1 | 5/2015 | Bilodeau et al. |
| 2019/0078257 A1 | 3/2019 | Husband et al. |

FOREIGN PATENT DOCUMENTS

| | | | |
|---|---|---|---|
| CA | 1149219 A | | 7/1983 |
| CA | 1162819 A | | 2/1984 |
| CA | 2292587 A1 | | 12/1998 |
| CA | 2093545 C | | 3/2001 |
| CA | 2437616 A1 | | 2/2005 |
| CA | 2750082 A1 | | 8/2010 |
| CH | 648071 A5 | | 2/1985 |
| CN | 1173904 A | | 2/1998 |
| CN | 1278830 A | | 1/2001 |
| CN | 1086189 C | | 6/2002 |
| CN | 1585839 A | | 2/2005 |
| CN | 1325725 C | | 7/2007 |
| DK | 175143 B1 | | 6/2004 |
| EP | 0039628 A1 | | 11/1981 |
| EP | 0051230 A1 | | 5/1982 |
| EP | 0273745 B1 | | 2/1991 |
| EP | 0442183 A1 | | 8/1991 |
| EP | 0492600 A1 | | 7/1992 |
| EP | 0499578 A1 | | 8/1992 |
| EP | 0579171 A1 | | 1/1994 |
| EP | 0619140 A2 | | 10/1994 |
| EP | 0785307 A2 | | 7/1997 |
| EP | 0790135 A2 | | 8/1997 |
| EP | 0614948 B1 | | 8/1999 |
| EP | 0988322 B1 | | 1/2002 |
| EP | 1053213 B1 | | 5/2002 |
| EP | 1469126 A1 | | 10/2004 |
| EP | 1538257 A1 | | 6/2005 |
| EP | 1936032 A1 | | 6/2008 |
| EP | 2196579 A1 | | 6/2010 |
| EP | 2216345 A1 | | 8/2010 |
| EP | 2236545 A1 | | 10/2010 |
| EP | 2236664 A1 | | 10/2010 |
| ES | 2100781 A1 | | 6/1997 |
| FR | 2689530 A1 | | 10/1993 |
| FR | 2774702 A1 | | 8/1999 |
| GB | 663621 A | | 12/1951 |
| GB | 2260146 | | 4/1993 |
| GB | 2260146 A | | 4/1993 |
| GB | 2265916 A | | 10/1993 |
| GB | 2275876 A | | 9/1994 |
| JP | S59132926 A | | 7/1984 |
| JP | 1156587 A | | 6/1989 |
| JP | H1-156587 A | | 6/1989 |
| JP | H 05-098589 A | | 4/1993 |
| JP | 6158585 A | | 6/1994 |
| JP | H08-81896 A | | 3/1996 |
| JP | H0881896 A1 | | 3/1996 |
| JP | 2528487 B2 | | 8/1996 |
| JP | 8-284090 A | | 10/1996 |
| JP | H09124702 A | | 5/1997 |
| JP | 10158303 A | | 6/1998 |
| JP | 2-976485 B2 | | 11/1999 |
| JP | 2004-231796 A | | 8/2004 |
| JP | 2004-523676 A | | 8/2004 |
| JP | 2004292970 A | | 10/2004 |
| JP | 2006-008857 A | | 1/2006 |
| JP | 2007-262594 A | | 10/2007 |
| JP | 2008-169497 A | | 7/2008 |
| JP | 2009-161613 A | | 7/2009 |
| JP | 2009-243014 A | | 10/2009 |
| JP | 2009-263854 A | | 11/2009 |
| JP | 2010-503775 A | | 2/2010 |
| JP | 2010-513741 A | | 4/2010 |
| JP | 2010-168716 A | | 8/2010 |
| JP | 2012-522145 A | | 9/2012 |
| JP | 2013-527333 A | | 6/2013 |
| JP | 2015024537 A | | 2/2015 |
| JP | 2016132241 A | | 7/2016 |
| JP | 2017071783 A | | 4/2017 |
| KR | 10-2009-0109532 A | | 10/2009 |
| NL | 8102857 A | | 1/1983 |
| SU | 499366 A1 | | 1/1977 |
| TW | 201013017 A1 | | 4/2010 |
| WO | 93/01333 A1 | | 1/1993 |
| WO | 93/15270 A1 | | 8/1993 |
| WO | 94/04745 A1 | | 3/1994 |
| WO | 97/18897 A2 | | 5/1997 |
| WO | 98/55693 A1 | | 12/1998 |
| WO | 98/56826 A1 | | 12/1998 |
| WO | 99/54045 A1 | | 10/1999 |
| WO | 00/66510 A1 | | 11/2000 |
| WO | 01/66600 A1 | | 9/2001 |
| WO | 01/98231 A1 | | 12/2001 |
| WO | 02/086238 A1 | | 10/2002 |
| WO | 02/100955 A1 | | 12/2002 |
| WO | 03/033815 A2 | | 4/2003 |
| WO | 03/044250 A1 | | 5/2003 |
| WO | 2004/016852 A2 | | 2/2004 |
| WO | 2004/055267 A1 | | 7/2004 |
| WO | 2005/014934 A2 | | 2/2005 |
| WO | 2005/100489 A1 | | 10/2005 |
| WO | 2005/123840 A1 | | 12/2005 |
| WO | 2006/009502 A1 | | 1/2006 |
| WO | 2007/088974 A1 | | 8/2007 |
| WO | 2007/091942 A1 | | 8/2007 |
| WO | 2007/096180 A2 | | 8/2007 |
| WO | 2007/110639 A1 | | 10/2007 |
| WO | 2008/033283 A1 | | 3/2008 |
| WO | 2008/076056 A1 | | 6/2008 |
| WO | 2008/076071 A1 | | 6/2008 |
| WO | 2008/095764 A1 | | 8/2008 |
| WO | 2008/132228 A1 | | 11/2008 |
| WO | 2009/074491 A1 | | 6/2009 |
| WO | 2009/122982 A1 | | 10/2009 |
| WO | 2009/126106 A1 | | 10/2009 |
| WO | 2010/015726 A1 | | 2/2010 |
| WO | 2010/092239 A1 | | 8/2010 |
| WO | 2010/102802 A1 | | 9/2010 |
| WO | 2010/112519 A1 | | 10/2010 |
| WO | 2010/113805 A1 | | 10/2010 |
| WO | 2010/115785 A1 | | 10/2010 |
| WO | 2010/13106 | | 11/2010 |
| WO | 2010/125247 A2 | | 11/2010 |
| WO | 2010/131016 A2 | | 11/2010 |
| WO | 2011/004300 A1 | | 1/2011 |
| WO | 2011/004301 A1 | | 1/2011 |
| WO | 201111431 A1 | | 1/2011 |
| WO | 2011/064441 A1 | | 6/2011 |
| WO | 2011/134939 A1 | | 11/2011 |
| WO | 2011147823 A1 | | 12/2011 |
| WO | 2012/098296 A2 | | 7/2012 |
| WO | 2013171373 A3 | | 11/2013 |
| WO | 2014044870 A1 | | 3/2014 |
| WO | 2014/091212 A1 | | 6/2014 |
| WO | 2014147295 A1 | | 9/2014 |
| WO | 2015034426 A1 | | 3/2015 |
| WO | 2017003364 A1 | | 1/2017 |
| WO | 2017046755 A1 | | 3/2017 |

(56) References Cited

FOREIGN PATENT DOCUMENTS

| WO | 2017/182877 A1 | 10/2017 |
|---|---|---|
| WO | 2017187350 A8 | 11/2017 |
| WO | 2017221137 A1 | 12/2017 |
| WO | 2018116223 A1 | 6/2018 |
| WO | 2018138702 A1 | 8/2018 |
| WO | 2018189698 A1 | 10/2018 |
| WO | 2019073370 A1 | 4/2019 |
| WO | 2019077514 A1 | 4/2019 |
| WO | 2019123238 A1 | 6/2019 |
| WO | 2019123405 A1 | 6/2019 |
| WO | 2019150291 A1 | 8/2019 |
| WO | 2019166929 A1 | 9/2019 |
| WO | 2019171279 A1 | 9/2019 |
| WO | 2020075056 A1 | 4/2020 |
| WO | 2020075057 A1 | 4/2020 |
| WO | 2020095254 A1 | 5/2020 |
| WO | 2020104900 A1 | 5/2020 |
| WO | 2020128997 A1 | 6/2020 |
| WO | 2020157609 A1 | 8/2020 |
| WO | 2016097964 A1 | 6/2021 |

OTHER PUBLICATIONS

Third Party Observations pursuant to Article 115(1) EPC concerning European Patent Application No. 12189681.5, dated Jul. 10, 2014, 15 pages.
Third Party Observations pursuant to Article 115(1) EPC concerning European Patent Application No. 10727476.3, dated Jul. 22, 2014, 18 pages.
Taiwanese Office Action for Taiwanese Application No. 099115704, dated Jul. 14, 2014, 8 pages.
European Office Action dated May 26, 2014 for European Patent Application No. 10 727 476.3-1308, 4 pages.
European Office Action dated Mar. 7, 2014 for European Patent Application No. 10 727 476.3-1308, 5 pages.
Australian Patent Examination Report No. 1 dated Feb. 26, 2014 for Australian Patent Application No. 2013202515, 3 pages.
Chinese Office Action and Search Report dated Jan. 6, 2014 for Chinese Application No. 201080003690.6, 15 pages.
Canadian Office Action dated Dec. 18, 2013 for Canadian Application No. 2,748,137.
European Office Action dated Feb. 6, 2014 for European Application No. 12 189 681.5-1308, 3 pages.
European Office Action dated Oct. 25, 2013 for European Patent Application No. 10 727 476.3-1308, 3 pages.
PCT International Search Report and Written Opinion for PCT Application No. PCT/GB2010/000982, dated Jun. 1, 2011, 15 pages.
European Extended European Search Report dated Jan. 15, 2013, for European Application No. 12189681.5, 5 pages.
European Office Action dated Nov. 30, 2012 for European Patent Application No. 10 727 476.3-2124, 4 pages.
Australian Patent Examination Report dated Jul. 26, 2012 for Australian Patent Application No. 2010247184, 6 pages.
United States, Office Action dated Jan. 17, 2012 for related U.S. Appl. No. 13/245,144.
PCT International Preliminary Report on Patentability for PCT International Application No. PCT/GB2010/000982, dated Nov. 24, 2011, 11 pages.
PCT International Search Report and Written Opinion for International Application No. PCT/N02010/000184, dated Sep. 13, 2010, 14 pages.
United Kingdom Search Report for UK Application No. GB0908401.3, dated Sep. 15, 2009, 4 pages.
Official Action dated Sep. 9, 2019 in corresponding Japanese Application No. 2018-165598, filing date of May 17, 2018 (5 pages).
Optifiner™ DF Deflakers, "Improved quality through effective deflaking." Stock Preparation and Recycled Fiber Systems, Metso Paper, (2006) 4 pages.
Pääkko et al., "Enzymatic Hydrolysis Combined with Mechanical Shearing and High-Pressure Homogenization for Nanoscale Cellulose Fibrils and Strong Gels," Biomacromolecules, vol. 8 (2007) pp. 1934-1941.
Peltola, Maarit, "Preparation of Microfibrillated Cellulose" Master of Science Thesis, Tampere University of Technology, May 2009, 98 pages.
Pöhler, Tiina & Lappalainen, Timo & Tammelin, Tekla & Eronen, Paula & Hiekkataipale, Panu & Vehniäinen, Annikki & M. Koskinen, Timo. (2011). "Influence of fibrillation method on the character of nanofibrillated cellulose (NFC)," 2010 TAPPI International Conference on Nanotechnology for the Forest Product Industry, Dipoli Congress Centre, Espoo, Finland, Sep. 27-29, 2010, 22 pages.
Porubská, et al., "Homo- and Heteroflocculation of Papermaking Fines and Fillers," Colloids and Surfaces A: Physiochem. Eng. Aspects, Elsevier Science, vol. 210 (2002) pp. 223-230.
Preparation and Application of Cellulose Nano Fiber, pp. 14-22.
Roberts, J.C., "Chapter 2, The Material of Paper," The Chemistry of Paper, RSC Paperbacks, 1996, pp. 11-25.
Roberts, J.C., "Chapter 4, The Material of Paper," The Chemistry of Paper, RSC Paperbacks, 1996, pp. 52-68.
Rowland and Roberts, "The Nature of Accessible Surfaces in the Microstructure of Cotton Cellulose," Journal of Polymer Science: Part A-1, vol. 10, (1972) pp. 2447-2461.
Saito et al., "Homogeneous Suspensions of Individualized Microfibrils from TEMPO-Catalyzed Oxidation of Native Cellulose," Biomacromolecules, American Chemical Society, vol. 7, No. 6 (2006) pp. 1687-1691.
Saito et al., "Cellulose Nanofibers Prepared by TEMPO-Mediated Oxidation of Native Cellulose," Biomacromolecules, (2007) 8:2485-2491.
Selder, H.; Mannes, W., and Matzke, W., "Broke systems for LWC, MWC and HWC Papers", Voith Sulzer Paper Technology, 8 pages, Dec. 2011.
Silenius, Petri, "Improving the Combinations of Critical Properties and Process Parameters of Printing and Writing Papers and Paperboards by New Paper-Filling Methods", Helsinki University of Technology Laboratory of Paper Technology Reports, Series A 14, Espoo 2002, 168 pages.
Sinnott et al., "Slurry Flow in a Tower Mill," Seventh International Conference on CFD in the Minerals and Process Industries, CSIRO, Melbourne, Australia, Dec. 9-11, 2009, pp. 1-7.
Siró, István, "Microfibrillated Cellulose and New Nanocomposite Materials: A Review," Cellulose, vol. 17 (2010) pp. 459-494.
Somboon et al., "Grit Segments in TMP Refining. Part 2: Potential for Energy Reduction," Appita Journal, vol. 62, No. 1 (2009) pp. 42-45 and 59.
Somboon et al., "Grit Segments in TMP Refining. Part 1: Operating Parameters and Pulp Quality," Appita Journal, vol. 62, No. 1 (2009) pp. 37-41.
Somboon, Phichit, "On the Application of Grits to Thermomechanical Pulp Refining." TKK Reports on Forest Products Technology, Series A7, Espoo 2009, 61 pages.
Spence et al., "The Effect of Chemical Composition on Microfibrillar Cellulose Films from Wood Pulps: Mechanical Processing and Physical Properties," BioResource Technology, vol. 101 (2010) pp. 5961-5968.
Subramanian et al., "Calcium Carbonate—Cellulose Fibre Composites; The Role of Pulp Refining," Paper Technology (2006) pp. 27-31.
Subramanian, Ramjee, "Engineering Fine Paper by Utilising the Structural Elements of the Raw Materials", Doctoral Thesis, TKK Reports in Department of Forest ProductsTechnology, Series A1, Espoo 2008, 65 pages.
Syverud, et al. "The influence of microfibrillated cellulose, MFC, on paper strength and surface properties", pp. 1-32.
Taniguchi, Takashi, "New Films Produced from Microfibrillated Natural Fibres," Polymer International, vol. 47 (1998) pp. 291-294.
Terao et al., "Pulp-Filler Interaction (3)—The Influence of Wet Pressing and Cellulosic Fines Addition on the Structure and Properties of Filler Loaded Papers," vol. 8 (1989) pp. 65-73.

(56) References Cited

OTHER PUBLICATIONS

Thorn et al., "Applications of Wet-End Paper Chemistry, Chapter 6, Fillers," Springer Science+Business Media B.V. (2009) pp. 113-136.
Torvinen, et al. "Flexible filler—nanocellulose structures", VTT Technical Research Centre of Finland—1 page.
Waterhouse, J .F., "Whither Refining?" Institute of Paper Science and Technology, No. 649 (1997) 40 pages.
Yano, et al., "Production and use of Machine bio-nano-par φ," (2009) pp. 73-80.
Yano, Hiroyuki, "High Performance of Bio Fibers by the Addition of Filler," vol. 55, No. 4 (2009) pp. 63-68.
Product information for the Ultra-fine Friction Grinder "Supermasscolloider," 1 page, retrieved from http:www.masuko.com/English/product/Masscolloder.html (2014).
Yano, Hiroyuki, "Production and Use of Cellulose Nanofibers," Timber Financial Industrial Technology (2009) vol. 27, No. 1, pp. 14-22.
Zhao et al., "Ultrasonic Technique for Extracting Nanofibers from Nature Materials," Applied Physics Letters 90, 073112 (2007) 2 pages.
Zirconium Oxide Data sheet, downloaded online from www.stanfordmaterials.com, downloaded on Jan. 12, 2012, 7 pages.
Zirconium, Silicate Data sheet, downloaded online from www.reade.com, downloaded on Jan. 12, 2012, 2 pages.
Zou and Hsieh, "Review of Microfibrillated Cellulose (MFC) for Papermaking," Pulp and Paper Engineering, School of Chemical and Biomolecular Eng., Georgia Institute of Technology, 10 pages.
Zou, Xuejun, "Production of Nanocrystalline Cellulose and its Potential Applications in Specialty Papers", Pira Specialty Papers Conference, Nov. 2010, pp. 1-30.
Pinkney et al., "Microfibrillated Cellulose—A New Structural Material," Engineering Doctorate Conference (2012), University of Birmingham, 2 pages.
Nakagaito, Antonio Norio, Preparation of Bio Fiber and their Application, pp. 73-80.
Chinese Office Action dated Sep. 5, 2017 from corresponding Chinese Patent Application No. 201510628033.5, 9 pages.
Mullite, 2001 [downloaded on-line Dec. 6, 2016], Mineral Data Publishing, 1 page.
Smook, Handbook for Pulp and Paper Technologies, 1992, Angus Wilde Publications, 2nd Edition, Chap. 13.
European Office Action dated Jul. 20, 2012 from corresponding European Patent Application No. 10727476.3, 4 pages.
European Search Report dated Sep. 16, 2016 from corresponding European Patent Application No. 16153032.4, 8 pages.
Indian Office Action dated Jun. 12, 2017 from corresponding Indian Patent Application No. 1474/MUMNP/2011, 12 pages.
Japanese Final Office Action dated Jun. 10, 2016 from corresponding Japanese Patent Application No. 2014-133028, 8 pages.
Japanese Decision Final Rejection dated Feb. 21, 2017 from corresponding Japanese Patent Application No. 2014-133028, 8 pages.
Korean Office Action dated Jul. 29, 2016 from corresponding Korean Patent Application No. 10-2015-7030983, 16 pages.
European Office Action dated Feb. 11, 2015 from corresponding European Patent Application No. 12189681.5, 5 pages.
European Office Action dated Sep. 4, 2017 from corresponding European Patent Application No. 16153032.4, 3 pages.
Third Party Observations pursuant to Article 115(1) EPC concerning European Patent Application No. 10727476.3, dated Apr. 17, 2013, 12 pages.
Abe, et al. "Obtaining Cellulose Nanofibers with a Uniform Width of 15 nm from Wood", Biomacromolecules, vol. 8, Width of 15 nm from Wood, Biomacromolecules, vol. 8, 2007, pp. 3276-3278.
Ahola, Susanna, "Properties and Interfacial Behaviour of Cellulose Nanofibrils." Doctoral Thesis, 2008, 82 pages.
Ankerfors, et al. "NanoCellulose Developments in Scandinavia", Paper and Coating Chemistry Symposium (PCCS), Jun. 2009, Hamilton, Canada, 43 pages.
Ankerfors, Mikael, "The manufacture of microfibrillated cellolose (MFC) its applications", Nanostructured cellulose and new cellulose derivatives seminar, Nov. 2006, pp. 1-40.
Atrex G-Series, Megatrex, "Technology for Reject Treatment and Recovery", 2 pages.
Berglund, et al. "Nanostructured Cellulose Products", Finnish-Swedish Wood Material Science Research Programme Opening Seminar, 2004, Helsinki, Finland, 28 pages.
Bhatnagar, et al. "Processing of Cellulose Nanofiber-reinforced Composites", Journal of Reinforced Plastics and Composites, vol. 24, No. 12, 2005, pp. 1259-1268.
Characterisation Newsletter, "Microfibrillated Cellulose", No. 5, Jan. 2009, pp. 1-2.
Chinga-Carrasco and Syverud, "Computer-Assisted Quantification of the Muli-Scale Structure of Films Made of Nanofibrillated Cellulose," J Nanopart Res (2010) 12:841-851.
Crofton et al., "Dielectric Studies of Cellulose and Its Derivatives: 1. Acetylation of Cellulose," Polymer (1982) 23:1605-1608.
Eichhorn, et al., "Review: Current International Research into Cellulose Nanofibres and Nanocomposites," Journal of Materials Science, vol. 45, No. 1, (2010) pp. 1-33.
Esau, Katherine, "Chapter 4, Cell Wall," Anatomy of Seed Plants, 2nd Edition, (1977) pp. 43-48.
Eriksen et al., "The Use of Microfibrillated Cellulose Produced from Kraft Pulp as Strength Enhancer in TMP Paper," Nordic Pulp and Paper Research Journal, vol. 23, No. 3, (2008) pp. 299-304.
Fahn, A., "Plant Anatomy Fourth Edition," (1990) pp. 32-39.
Fengel et al., "Chapter 4. Cellulose," Wood Chemistry, Ultrastructure, Reactions, (1983) pp. 66-105.
Fengel, D., "Ideas on the Ultrastructure Organization of the Cell Wall Components," J. Polymer Sci.: Part C, No. 36 (1971) pp. 383-392.
Frey-Wyssling and Mühlethaler, "The Fine Structure of Cellulose." Fortschritte der Chemie Organischer Naturstoffe(1951) pp. 1-27.
Fukui, Yoshitaka, "Microfibrillated Cellulose", vol. 60, No. 24, 1985, pp. 5-12.
GL&V, Pulp and Paper Division, The Atrex System at M-real Hallein Paper Mill in Austria, "Atrex is running well and saving us money!", 4 pages.
Handbook of Pulp, Edited by Herbert Sixta, Wiley-VCH (2006), pp. 41-42—XP007918817.
Henriksson, Marielle, "Cellulose Nanofibril Networks and Composites, Preparation, Structure and Properties," KTH Chemical Science and Engineering, 2008, 60 pages.
Henriksson, et al., "Cellulose Nanopaper Structures of High Toughness," Biomacromolecules, vol. 9 (2008) pp. 1579-1585.
Hentze, Hans-Peter, "From Nanocellulose Science Towards Applications," VTT—Technical Research Center of Finland, PulPaper2010, Jun. 2010, Helsinki, pp. 1-24.
Subramanian, Ramjee, "Engineering Fine Paper by Utilizing the Structural Elements of the Raw Materials," TKK Reports in Department of Forest Products Technology, Series A1 Espoo 2008, Abstract 3 pages, retrieved from http://lib.tkk.fi/Diss/2008/isbn9789512295234/.
http://puu.tkk.fi/em/research/research_groups/chemical_pupling_and_wood_refinery/seminar_presentations/43 knuts_100609_1aitoksen_sisainen_seminaariesitys.pdf;Knuts, M.SC. Aaro, "Process installation and optimization to D refine and produce NFC materials." pp. 1-9, 2010.
Hubbe et al. "What Happens to Cellulosic Fibers During Papermaking and Recycling? A Review", BioResources, vol. 2, No. 4, 2007, pp. 739-788.
Hubbe et al., "Cellulosic Nanocomposites: A Review," BioResources vol. 3, No. 3 (2008), pp. 929-980.
Hult et al., "Cellulose Fibril Aggregation—An Inherent Property of Kraft Pulps," Polymer 42 (2001) pp. 3309-3314.
Husband et al., "The Influence of Kaolin Shape Factor on the Stiffness of Coated Papers," TAPPI Journal (2009) pp. 12-17.
Husband et al., "The Influence of Pigment Particle Shape on the In-Plane Tensile Strength Properties of Kaolin-Based Coating Layers," TAPPI Journal, vol. 5 No. 12 (2006) pp. 3-8.
Innventia, "Processes for Nano cellulose," http://www.innventia.com/templates/STFIPage_ 9108.aspx, 2011, 1 page.

(56) References Cited

OTHER PUBLICATIONS

Iwamoto, et al., "Nano-Fibrillation of Pulp Fibers for the Processing of Transparent Nanocomposites," Applied Physics A, vol. 89 (2007) pp. 461-466.
Iwamoto, et al., "Optically Transparent Composites Reinforced with Plant Fiber-Based Nanofibers," Applied Physics A, vol. 81 (2005) pp. 1109-1112.
Janardhnan and Sain, "Isolation of Cellulose Microfibrils—An Enzymatic Approach," BioResources, vol. 1, No. 2 (2006) pp. 176-188.
Kang, Taegeun, "Role of External Fibrillation in Pulp and Paper Properties," Doctoral Thesis, Helsinki University of Technology, Laboratory of Paper and Printing Technology Reports, Series A28, Espoo 2007, 50 pages.
Klemm, et al., "Nanocelluloses as Innovative Polymers in Research and Application," Adv. Polymer Science, vol. 205 (2006) pp. 49-96.
Klungness, et al. "Fiber-Loading: A Progress Report", TAPPI Proceedings, 1994 Recycling Symposium, pp. 283-290.
Chinese Office Action and Search Report dated Jan. 10, 2017 from corresponding Chinese Patent Application No. 201510628033.5, 17 pages.
Littunen, Kuisma, "Free Radical Graft Copolymerization of Microfibrillated Cellulose," Master's Thesis, Helsinki University of Technology, Sep. 2009, 83 pages.
Ioelovich and Figovsky, "Structure and Properties of Nanoparticles Used in Paper Compositions," Mechanics of Composite Materials, vol. 46, No. 4, 2010, pp. 435-442.
Ioelovich, Michael, "Cellulose as a Nanostructured Polymer: A Short Review," BioResources, vol. 3, No. 4 (2008) pp. 1403-1418.
Ioelovich, Michael, "Structure and Properties of Nano-Particles Used in Paper Compositions," XXI TECNICELPA Conference and Exhibition/VI CIADICYP 2010, Portugal, 7 pages.
Luukkanen, Lauri, "Reducing of Paper Porosity and Roughness Through Layered Structure", Aalto University School of Science and Technology, Master's thesis for the degree of Master of Science in Technology, Espoo, May 2010, 132 pages.
Mill (grinding) http://en_wikipedia.org/w/index.php?title-File:Hammer_mill_open-_front_full.jgp, 8 pgs.

Mathur, V. "GRI's Fibrous Filler Technology Presentation to TAPPI", Philadelphia, PA (slides only), (2005) pp. 1-10.
McGinnis and Shafizadeh, "Chapter 1 Cellulose and Hemicellulose," Pulp and Paper: Chemistry and Chemical Technology, (1980) pp. 1-38.
McGraw-Hill, "Cell Walls (Plant)," Encyclopedia of Science and Technology, 5th edition, (1982), pp. 737-741.
Mori, et al., "Effect of Cellulose Nano-Fiber on Calcium Carbonate Crystal Form," Polymer Preprints, Japan, vol. 56, No. 2 (2007) 1 page.
Mörseburg and Chinga-Carrasco, "Assessing the Combined Benefits of Clay and Nanofibrillated Cellulose in Layered TMP-Based Sheets," Cellulose, vol. 16, (2009) pp. 795-806.
Nakagaito and Yano, "The Effect of Fiber Content on the Mechanical and Thermal Expansion Properties of Biocomposites Based on Microfibrillated Cellulose," Cellulose, vol. 15 (2008) pp. 555-559.
United States, Office Action dated Apr. 16, 2020 in related U.S. Appl. No. 16/117,582, filed Aug. 30, 2018 (57 pages).
United States, Office Action dated Oct. 12, 2016 in U.S. Appl. No. 14/394,533, filed Oct. 15, 2014 (7 pages).
United States, Final Office Action dated Jul. 20, 2017 in U.S. Appl. No. 14/394,533, filed Oct. 15, 2014 (9 pages).
United States, Office Action dated Apr. 6, 2018 in U.S. Appl. No. 14/394,533, filed Oct. 15, 2014 (25 pages).
United States, Final Office Action dated Jan. 17, 2019 in U.S. Appl. No. 14/394,533, filed Oct. 15, 2014 (28 pages).
United States, Final Office Action dated Nov. 8, 2019 in U.S. Appl. No. 14/394,533, filed Oct. 15, 2014 (7 pages).
United States, Office Action dated Jun. 1, 2020 in U.S. Appl. No. 14/394,533, filed Oct. 15, 2014 (17 pages).
United States, Office Action dated Jun. 10, 2019 in U.S. Appl. No. 16/205,458, filed Nov. 30, 2018 (30 pages).
Aulin, Christian, et al, "Multilayered Alkyd Resin/Nanocellulose Coatings for Use in Renewable Packaging Solutions with a High Level of Moisture Resistance," Ind. Eng. Chem. Res. (2013) 52, pp. 2582-2589.
Spence, Kelley L., et al, "Water Vapor Barrier Properties of Coated and Filled Microfibrillated Cellulose Composite Films," (2011) BioResources 6(4), pp. 4370-4388.
Extended European Search Report dated Aug. 28, 2020 in European Application No. 20168351.3, 8 pages.
Japanese Office Action dated May 27, 2021 in Japanese Application No. 2020-038633, 5 pages.

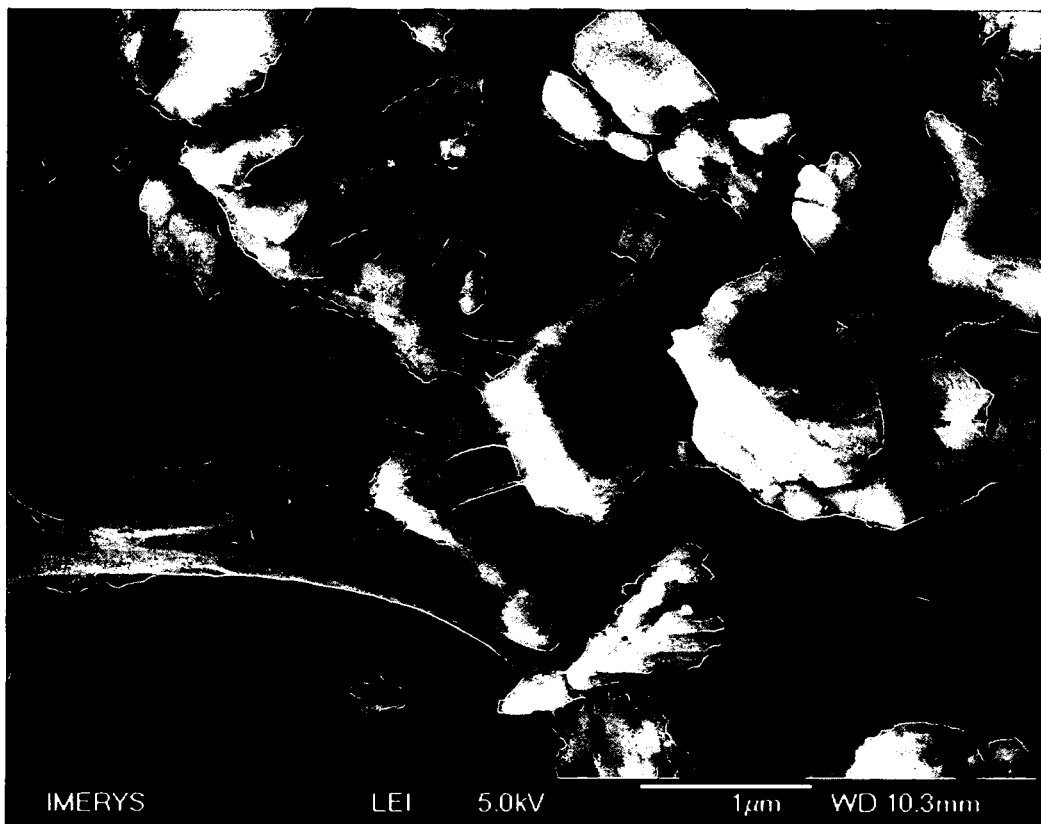

PAPER FILLER COMPOSITION

CROSS REFERENCE TO RELATED APPLICATIONS

This application is a divisional of U.S. application Ser. No. 14/843,516, filed Sep. 2, 2015, which is a continuation of U.S. application Ser. No. 12/994,356, filed Mar. 14, 2011, now U.S. Pat. No. 9,127,405, which is a U.S. National Stage Entry under 35 U.S.C. § 371 from PCT International Application No. PCT/GB2010/000982, filed May 17, 2010, and claims priority to and the benefit of the filing date of Great Britain Application No. GB 0908401.3, filed May 15, 2009, the subject matter of all of which is incorporated herein by reference.

FIELD OF THE INVENTION

The present invention relates to a method of preparing an aqueous suspension comprising microfibrillated cellulose and inorganic particulate material suitable for use in a method of making paper or coating paper, and to filled and coated papers made from said aqueous suspension.

BACKGROUND OF THE INVENTION

Inorganic particulate materials, for example an alkaline earth metal carbonate (e.g. calcium carbonate) or kaolin, are used widely in a number of applications. These include the production of mineral containing compositions which may be used in paper manufacture or paper coating. In paper products such fillers are typically added to replace a portion of other more expensive components of the paper product. Fillers may also be added with an aim of modifying the physical, mechanical, and/or optical requirements of paper products. Clearly, the greater the amount of filler that can be included, the greater potential for cost savings. However, the amount of filler added and the associated cost saving must be balanced against the physical, mechanical and optical requirements of the final paper product. Thus, there is a continuing need for the development of fillers for paper which can be used at a high loading level without adversely effecting the physical, mechanical and/or optical requirements of paper products. There is also a need for the development of methods for preparing such fillers economically.

The present invention seeks to provide alternative and/or improved fillers for paper products which may be incorporated in the paper product at relatively high loading levels whilst maintaining or even improving the physical, mechanical and/or optical properties of the paper product. The present invention also seeks to provide an economical method for preparing such fillers. As such, the present inventors have surprisingly found that a filler comprising microfibrillated cellulose and an inorganic particulate material can be prepared by economical methods and can be loaded in paper products at relatively high levels whilst maintaining or even improving the physical, mechanical and/or optical properties of the final paper product.

Further, the present invention seeks to address the problem of preparing microfibrillated cellulose economically on an industrial scale. Current methods of microfibrillating cellulosic material require relatively high amounts of energy owing in part to the relatively high viscosity of the starting material and the microfibrillated product, and a commercially viable process for preparing microfibrillated cellulose on an industrial scale has hitherto before proved elusive.

SUMMARY OF THE INVENTION

According to a first aspect, the present invention is directed to a method for preparing an aqueous suspension comprising microfibrillated cellulose and inorganic particulate material, the method comprising a step of microfibrillating a fibrous substrate comprising cellulose in an aqueous environment in the presence of an inorganic particulate material.

According to a second aspect, the present invention is directed to an aqueous suspension suitable for use as filler in paper or a paper coating obtained by a method according to the first aspect.

According to a third aspect, the present invention is directed to an aqueous suspension suitable for use as filler in paper or a paper coating comprising microfibrillated cellulose and inorganic particulate material.

According to a fourth aspect, the present invention is directed to a papermaking composition comprising the aqueous suspension of the second and third aspects.

According to a fifth aspect, the present invention is directed to a paper product prepared from the papermaking composition of the fourth aspect.

According to a sixth aspect, the present invention is directed to a paper coating composition comprising the aqueous suspension of the second and third aspects and other optional additives.

According to a seventh aspect, the present invention is directed to a paper product, for example paper board, coated with the paper coating composition of the sixth aspect.

According to an eighth aspect, the present invention is directed to a process for making a paper product comprising: (i) obtaining or preparing a fibrous substrate comprising cellulose in the form of a pulp suitable for making a paper product; (ii) preparing a papermaking composition from the pulp in step (i), the aqueous suspension according to the second or third aspects of the invention, and other optional additives; and (iii) forming a paper product from said papermaking composition.

According to a ninth aspect, the present invention is directed to an integrated process for making a paper product comprising: (i) obtaining or preparing a fibrous substrate comprising cellulose in the form of a pulp suitable for making a paper product; (ii) microfibrillating a portion of said fibrous substrate comprising cellulose in accordance with the method of the first aspect of the invention to prepare an aqueous suspension comprising microfibrillated and inorganic particulate material; (iii) preparing a papermaking composition from the pulp in step (i), the aqueous suspension prepared in step (ii), and other optional additives; and (iv) forming a paper product from said papermaking composition.

According to a tenth aspect, the present invention is directed to the use of an aqueous suspension according to the second and third aspects of the invention as a filler in a papermaking composition.

According to an eleventh aspect, the present invention is directed to the use of an aqueous suspension according to the second and third aspects of the invention in a paper coating composition.

BRIEF DESCRIPTION OF THE DRAWINGS

FIG. 1 is a SEM micrograph of microfibrillated cellulose prepared with GCC in accordance with the methods of the present invention.

DETAILED DESCRIPTION OF THE INVENTION

The Fibrous Substrate Comprising Cellulose

The fibrous substrate comprising cellulose may be derived from any suitable source, such as wood, grasses (e.g., sugarcane, bamboo) or rags (e.g., textile waste, cotton, hemp or flax). The fibrous substrate comprising cellulose may be in the form of a pulp (i.e., a suspension of cellulose fibres in water), which may be prepared by any suitable chemical or mechanical treatment, or combination thereof. For example, the pulp may be a chemical pulp, or a chemithermomechanical pulp, or a mechanical pulp, or a recycled pulp, or a papermill broke, or a papermill waste stream, or waste from a papermill, or a combination thereof. The cellulose pulp may be beaten (for example in a Valley beater) and/or otherwise refined (for example, processing in a conical or plate refiner) to any predetermined freeness, reported in the art as Canadian standard freeness (CSF) in $cm^3$. CSF means a value for the freeness or drainage rate of pulp measured by the rate that a suspension of pulp may be drained. For example, the cellulose pulp may have a Canadian standard freeness of about 10 $cm^3$ or greater prior to being microfibrillated. The cellulose pulp may have a CSF of about 700 $cm^3$ or less, for example, equal to or less than about 650 $cm^3$, or equal to or less than about 600 $cm^3$, or equal to or less than about 550 $cm^3$, or equal to or less than about 500 $cm^3$, or equal to or less than about 450 $cm^3$, or equal to or less than about 400 $cm^3$, or equal to or less than about 350 $cm^3$, or equal to or less than about 300 $cm^3$, or equal to or less than about 250 $cm^3$, or equal to or less than about 200 $cm^3$, or equal to or less than about 150 $cm^3$, or equal to or less than about 100 $cm^3$, or equal to or less than about 50 $cm^3$. The cellulose pulp may then be dewatered by methods well known in the art, for example, the pulp may be filtered through a screen in order to obtain a wet sheet comprising at least about 10% solids, for example at least about 15% solids, or at least about 20% solids, or at least about 30% solids, or at least about 40% solids. The pulp may be utilised in an unrefined state, that is to say without being beaten or dewatered, or otherwise refined.

The fibrous substrate comprising cellulose may be added to a grinding vessel or homogenizer in a dry state. For example, a dry paper broke may be added directly to the grinder vessel. The aqueous environment in the grinder vessel will then facilitate the formation of a pulp.

The Inorganic Particulate Material

The inorganic particulate material may, for example, be an alkaline earth metal carbonate or sulphate, such as calcium carbonate, magnesium carbonate, dolomite, gypsum, a hydrous kandite day such as kaolin, halloysite or ball clay, an anhydrous (calcined) kandite clay such as metakaolin or fully calcined kaolin, talc, mica, perlite or diatomaceous earth, or magnesium hydroxide, or aluminium trihydrate, or combinations thereof.

A preferred inorganic particulate material for use in the method according to the first aspect of the present invention is calcium carbonate. Hereafter, the invention may tend to be discussed in terms of calcium carbonate, and in relation to aspects where the calcium carbonate is processed and/or treated. The invention should not be construed as being limited to such embodiments.

The particulate calcium carbonate used in the present invention may be obtained from a natural source by grinding. Ground calcium carbonate (GCC) is typically obtained by crushing and then grinding a mineral source such as chalk, marble or limestone, which may be followed by a particle size classification step, in order to obtain a product having the desired degree of fineness. Other techniques such as bleaching, flotation and magnetic separation may also be used to obtain a product having the desired degree of fineness and/or colour. The particulate solid material may be ground autogenously, i.e. by attrition between the particles of the solid material themselves, or, alternatively, in the presence of a particulate grinding medium comprising particles of a different material from the calcium carbonate to be ground. These processes may be carried out with or without the presence of a dispersant and biocides, which may be added at any stage of the process.

Precipitated calcium carbonate (PCC) may be used as the source of particulate calcium carbonate in the present invention, and may be produced by any of the known methods available in the art. TAPPI Monograph Series No 30, "Paper Coating Pigments", pages 34-35 describes the three main commercial processes for preparing precipitated calcium carbonate which is suitable for use in preparing products for use in the paper industry, but may also be used in the practice of the present invention. In all three processes, a calcium carbonate feed material, such as limestone, is first calcined to produce quicklime, and the quicklime is then slaked in water to yield calcium hydroxide or milk of lime. In the first process, the milk of lime is directly carbonated with carbon dioxide gas. This process has the advantage that no byproduct is formed, and it is relatively easy to control the properties and purity of the calcium carbonate product. In the second process the milk of lime is contacted with soda ash to produce, by double decomposition, a precipitate of calcium carbonate and a solution of sodium hydroxide. The sodium hydroxide may be substantially completely separated from the calcium carbonate if this process is used commercially. In the third main commercial process the milk of lime is first contacted with ammonium chloride to give a calcium chloride solution and ammonia gas. The calcium chloride solution is then contacted with soda ash to produce by double decomposition precipitated calcium carbonate and a solution of sodium chloride. The crystals can be produced in a variety of different shapes and sizes, depending on the specific reaction process that is used. The three main forms of PCC crystals are aragonite, rhombohedral and scalenohedral, all of which are suitable for use in the present invention, including mixtures thereof.

Wet grinding of calcium carbonate involves the formation of an aqueous suspension of the calcium carbonate which may then be ground, optionally in the presence of a suitable dispersing agent. Reference may be made to, for example, EP-A-614948 (the contents of which are incorporated by reference in their entirety) for more information regarding the wet grinding of calcium carbonate.

In some circumstances, minor additions of other minerals may be included, for example, one or more of kaolin, calcined kaolin, wollastonite, bauxite, talc or mica, could also be present.

When the inorganic particulate material of the present invention is obtained from naturally occurring sources, it may be that some mineral impurities will contaminate the ground material. For example, naturally occurring calcium carbonate can be present in association with other minerals.

Thus, in some embodiments, the inorganic particulate material includes an amount of impurities. In general, however, the inorganic particulate material used in the invention will contain less than about 5% by weight, preferably less than about 1% by weight, of other mineral impurities.

The inorganic particulate material used during the microfibrillating step of the method of the present invention will preferably have a particle size distribution in which at least about 10% by weight of the particles have an e.s.d of less than 2 µm, for example, at least about 20% by weight, or at least about 30% by weight, or at least about 40% by weight, or at least about 50% by weight, or at least about 60% by weight, or at least about 70% by weight, or at least about 80% by weight, or at least about 90% by weight, or at least about 95% by weight, or about 100% of the particles have an e.s.d of less than 2 µm.

Unless otherwise stated, particle size properties referred to herein for the inorganic particulate materials are as measured in a well known manner by sedimentation of the particulate material in a fully dispersed condition in an aqueous medium using a Sedigraph 5100 machine as supplied by Micromeritics Instruments Corporation, Norcross, Ga., USA (telephone: +1 770 662 3620; web-site: www.micromeritics.com), referred to herein as a "Micromeritics Sedigraph 5100 unit". Such a machine provides measurements and a plot of the cumulative percentage by weight of particles having a size, referred to in the art as the 'equivalent spherical diameter' (e.s.d), less than given e.s.d values. The mean particle size $d_{50}$ is the value determined in this way of the particle e.s.d at which there are 50% by weight of the particles which have an equivalent spherical diameter less than that $d_{50}$ value.

Alternatively, where stated, the particle size properties referred to herein for the inorganic particulate materials are as measured by the well known conventional method employed in the art of laser light scattering, using a Malvern Mastersizer S machine as supplied by Malvern Instruments Ltd (or by other methods which give essentially the same result). In the laser light scattering technique, the size of particles in powders, suspensions and emulsions may be measured using the diffraction of a laser beam, based on an application of Mie theory. Such a machine provides measurements and a plot of the cumulative percentage by volume of particles having a size, referred to in the art as the 'equivalent spherical diameter' (e.s.d), less than given e.s.d values. The mean particle size $d_{50}$ is the value determined in this way of the particle e.s.d at which there are 50% by volume of the particles which have an equivalent spherical diameter less than that $d_{50}$ value.

In another embodiment, the inorganic particulate material used during the microfibrillating step of the method of the present invention will preferably have a particle size distribution, as measured using a Malvem Mastersizer S machine, in which at least about 10% by volume of the particles have an e.s.d of less than 2 µm, for example, at least about 20% by volume, or at least about 30% by volume, or at least about 40% by volume, or at least about 50% by volume, or at least about 60% by volume, or at least about 70% by volume, or at least about 80% by volume, or at least about 90% by volume, or at least about 95% by volume, or about 100% of the particles by volume have an e.s.d of less than 2 µm.

Unless otherwise stated, particle size properties of the microfibrillated cellulose materials are as are as measured by the well known conventional method employed in the art of laser light scattering, using a Malvern Mastersizer S machine as supplied by Malvem Instruments Ltd (or by other methods which give essentially the same result).

Details of the procedure used to characterise the particle size distributions of mixtures of inorganic particle material and microfibrillated cellulose using a Malvern Mastersizer S machine are provided below.

Another preferred inorganic particulate material for use in the method according to the first aspect of the present invention is kaolin clay. Hereafter, this section of the specification may tend to be discussed in terms of kaolin, and in relation to aspects where the kaolin is processed and/or treated. The invention should not be construed as being limited to such embodiments. Thus, in some embodiments, kaolin is used in an unprocessed form.

Kaolin clay used in this invention may be a processed material derived from a natural source, namely raw natural kaolin clay mineral. The processed kaolin clay may typically contain at least about 50% by weight kaolinite. For example, most commercially processed kaolin days contain greater than about 75% by weight kaolinite and may contain greater than about 90%, in some cases greater than about 95% by weight of kaolinite.

Kaolin day used in the present invention may be prepared from the raw natural kaolin clay mineral by one or more other processes which are well known to those skilled in the art, for example by known refining or beneficiation steps.

For example, the day mineral may be bleached with a reductive bleaching agent, such as sodium hydrosulfite. If sodium hydrosulfite is used, the bleached clay mineral may optionally be dewatered, and optionally washed and again optionally dewatered, after the sodium hydrosulfite bleaching step.

The clay mineral may be treated to remove impurities, e.g. by flocculation, flotation, or magnetic separation techniques well known in the art. Alternatively the clay mineral used in the first aspect of the invention may be untreated in the form of a solid or as an aqueous suspension.

The process for preparing the particulate kaolin clay used in the present invention may also include one or more comminution steps, e.g., grinding or milling. Light comminution of a coarse kaolin is used to give suitable delamination thereof. The comminution may be carried out by use of beads or granules of a plastic (e.g. nylon), sand or ceramic grinding or milling aid. The coarse kaolin may be refined to remove impurities and improve physical properties using well known procedures. The kaolin clay may be treated by a known particle size classification procedure, e.g., screening and centrifuging (or both), to obtain particles having a desired $d_{50}$ value or particle size distribution.

The Microfibrillating Process

In accordance with the first aspect of the invention, there is provided a method of preparing a composition for use as a filler in paper or as a paper coating, comprising a step of microfibrillating a fibrous substrate comprising cellulose in the presence of an inorganic particulate material. According to particular embodiments of the present methods, the microfibrillating step is conducted in the presence of an inorganic particulate material which acts as a microfibrillating agent.

By microfibrillating is meant a process in which microfibrils of cellulose are liberated or partially liberated as individual species or as smaller aggregates as compared to the fibres of the pre-microfibrillated pulp. Typical cellulose fibres (i.e., pre-microfribrillated pulp) suitable for use in papermaking include larger aggregates of hundreds or thousands of individual cellulose microfibrils. By microfibrillating the cellulose, particular characteristics and properties, including but not limited to the characteristic and properties described herein, are imparted to the microfibrillated cellulose and the compositions including the microfibrillated cellulose.

An exemplary microfibrillated cellulose prepared in accordance with the methods of the present invention is depicted in FIG. 1. FIG. 1 is a SEM micrograph of microfibrillated cellulose (having a $d_{50}$ of 80 μm) prepared with GCC (60 wt %<2 μm particle size, by Sedigraph) at 5.0% pulp on total dry weight. The media (Carbolite 16/20) volume concentration (MVC) was 50%. The energy input was 2500 kWh/t expressed on fibre.

The step of microfibrillating may be carried out in any suitable apparatus, including but not limited to a refiner. In one embodiment, the microfibrillating step is conducted in a grinding vessel under wet-grinding conditions. In another embodiment, the microfibrillating step is carried out in a homogenizer. Each of these embodiments is described in greater detail below.

Wet-Grinding

The grinding is suitably performed in a conventional manner. The grinding may be an attrition grinding process in the presence of a particulate grinding medium, or may be an autogenous grinding process, i.e., one in the absence of a grinding medium. By grinding medium is meant a medium other than the inorganic particulate material which is co-ground with the fibrous substrate comprising cellulose.

The particulate grinding medium, when present, may be of a natural or a synthetic material. The grinding medium may, for example, comprise balls, beads or pellets of any hard mineral, ceramic or metallic material. Such materials may include, for example, alumina, zirconia, zirconium silicate, aluminium silicate or the mullite-rich material which is produced by calcining kaolinitic clay at a temperature in the range of from about 1300° C. to about 1800° C. For example, in some embodiments a Carbolite® grinding media is preferred. Alternatively, particles of natural sand of a suitable particle size may be used.

Generally, the type of and particle size of grinding medium to be selected for use in the invention may be dependent on the properties, such as, e.g., the particle size of, and the chemical composition of, the feed suspension of material to be ground. Preferably, the particulate grinding medium comprises particles having an average diameter in the range of from about 0.1 mm to about 6.0 mm and, more preferably, in the range of from about 0.2 mm to about 4.0 mm. The grinding medium (or media) may be present in an amount up to about 70% by volume of the charge. The grinding media may be present in amount of at least about 10% by volume of the charge, for example, at least about 20% by volume of the charge, or at least about 30% by volume of the charge, or at least about 40% by volume of the charge, or at least about 50% by volume of the charge, or at least about 60% by volume of the charge.

The grinding may be carried out in one or more stages. For example, a coarse inorganic particulate material may be ground in the grinder vessel to a predetermined particle size distribution, after which the fibrous material comprising cellulose is added and the grinding continued until the desired level of microfibrillation has been obtained. The coarse inorganic particulate material used in accordance with the first aspect of this invention initially may have a particle size distribution in which less than about 20% by weight of the particles have an e.s.d of less than 2 μm, for example, less than about 15% by weight, or less than about 10% by weight of the particles have an e.s.d. of less than 2 μm. In another embodiment, the coarse inorganic particulate material used in accordance with the first aspect of this invention initially may have a particle size distribution, as measured using a Malvem Mastersizer S machine, in which less than about 20% by volume of the particles have an e.s.d of less than 2 μm, for example, less than about 15% by volume, or less than about 10% by volume of the particles have an e.s.d. of less than 2 μm The coarse inorganic particulate material may be wet or dry ground in the absence or presence of a grinding medium. In the case of a wet grinding stage, the coarse inorganic particulate material is preferably ground in an aqueous suspension in the presence of a grinding medium. In such a suspension, the coarse inorganic particulate material may preferably be present in an amount of from about 5% to about 85% by weight of the suspension; more preferably in an amount of from about 20% to about 80% by weight of the suspension. Most preferably, the coarse inorganic particulate material may be present in an amount of about 30% to about 75% by weight of the suspension. As described above, the coarse inorganic particulate material may be ground to a particle size distribution such that at least about 10% by weight of the particles have an e.s.d of less than 2 μm, for example, at least about 20% by weight, or at least about 30% by weight, or at least about 40% by weight, or at least about 50% by weight, or at least about 60% by weight, or at least about 70% by weight, or at least about 80% by weight, or at least about 90% by weight, or at least about 95% by weight, or about 100% by weight of the particles, have an e.s.d of less than 2 μm, after which the cellulose pulp is added and the two components are co-ground to microfibrillate the fibres of the cellulose pulp. In another embodiment, the coarse inorganic particulate material is ground to a particle size distribution, as measured using a Malvem Mastersizer S machine such that at least about 10% by volume of the particles have an e.s.d of less than 2 μm, for example, at least about 20% by volume, or at least about 30% by volume or at least about 40% by volume, or at least about 50% by volume, or at least about 60% by volume, or at least about 70% by volume, or at least about 80% by volume, or at least about 90% by volume, or at least about 95% by volume, or about 100% by volume of the particles, have an e.s.d of less than 2 μm, after which the cellulose pulp is added and the two components are co-ground to microfibrillate the fibres of the cellulose pulp In one embodiment, the mean particle size ($d_{50}$) of the inorganic particulate material is reduced during the co-grinding process. For example, the $d_{50}$ of the inorganic particulate material may be reduced by at least about 10% (as measured by a Malvern Mastersizer S machine), for example, the $d_{50}$ of the inorganic particulate material may be reduced by at least about 20%, or reduced by at least about 30%, or reduced by at least about 50%, or reduced by at least about 50%, or reduced by at least about 60%, or reduced by at least about 70%, or reduced by at least about 80%, or reduced by at least about 90%. For example, an inorganic particulate material having a $d_{50}$ of 2.5 μm prior to co-grinding and a $d_{50}$ of 1.5 μm post co-grinding will have been subject to a 40% reduction in particle size. In embodiments, the mean particle size of the inorganic particulate material is not significantly reduced during the co-grinding process. By 'not significantly reduced' is meant that the $d_{50}$ of the inorganic particulate material is reduced by less than about 10%, for example, the $d_{50}$ of the inorganic particulate material is reduced by less than about 5%.

The fibrous substrate comprising cellulose may be microfibrillated in the presence of an inorganic particulate material to obtain microfibrillated cellulose having a $d_{50}$ ranging from about 5 to μm about 500 μm, as measured by laser light scattering. The fibrous substrate comprising cellulose may be microfibrillated in the presence of an inorganic particulate material to obtain microfibrillated cellulose having a $d_{50}$ of equal to or less than about 400 μm, for example equal to or less than about 300 μm, or equal to or less than about 200 μm, or equal to or less than about 150 μm, or equal to or less than about 125 μm, or equal to or less than about 100 μm, or equal to or less than about 90 μm, or equal to or less than about 80 μm, or equal to or less than about 70 μm, or equal to or less than about 60 μm, or equal to or less than about 50 μm, or equal to or less than about 40 μm, or equal to or less than about 30 μm, or equal to or less than about 20 μm, or equal to or less than about 10 μm.

The fibrous substrate comprising cellulose may be microfibrillated in the presence of an inorganic particulate material to obtain microfibrillated cellulose having a modal fibre particle size ranging from about 0.1-500 μm and a modal inorganic particulate material particle size ranging from 0.25-20 μm. The fibrous substrate comprising cellulose may be microfibrillated in the presence of an inorganic particulate material to obtain microfibrillated cellulose having a modal fibre particle size of at least about 0.5 μm, for example at least about 10 μm, or at least about 50 μm, or at least about 100 μm, or at least about 150 μm, or at least about 200 μm, or at least about 300 μm, or at least about 400 μm.

The fibrous substrate comprising cellulose may be microfibrillated in the presence of an inorganic particulate material to obtain microfibrillated cellulose having a fibre steepness equal to or greater than about 10, as measured by Malvern. Fibre steepness (i.e., the steepness of the particle size distribution of the fibres) is determined by the following formula:

$$\text{Steepness} = 100 \times (d_{30}/d_{70})$$

The microfibrillated cellulose may have a fibre steepness equal to or less than about 100. The microfibrillated cellulose may have a fibre steepness equal to or less than about 75, or equal to or less than about 50, or equal to or less than about 40, or equal to or less than about 30. The microfibrillated cellulose may have a fibre steepness from about 20 to about 50, or from about 25 to about 40, or from about 25 to about 35, or from about 30 to about 40.

The grinding is suitably performed in a grinding vessel, such as a tumbling mill (e.g., rod, ball and autogenous), a stirred mill (e.g., SAM or IsaMill), a tower mill, a stirred media detrital (SMD), or a grinding vessel comprising rotating parallel grinding plates between which the feed to be ground is fed.

In one embodiment, the grinding vessel is a tower mill. The tower mill may comprise a quiescent zone above one or more grinding zones. A quiescent zone is a region located towards the top of the interior of tower mill in which minimal or no grinding takes place and comprises microfibrillated cellulose and inorganic particulate material. The quiescent zone is a region in which particles of the grinding medium sediment down into the one or more grinding zones of the tower mill.

The tower mill may comprise a classifier above one or more grinding zones. In an embodiment, the classifier is top mounted and located adjacent to a quiescent zone. The classifier may be a hydrocyclone.

The tower mill may comprise a screen above one or more grind zones. In an embodiment, a screen is located adjacent to a quiescent zone and/or a classifier. The screen may be sized to separate grinding media from the product aqueous suspension comprising microfibrillated cellulose and inorganic particulate material and to enhance grinding media sedimentation.

In an embodiment, the grinding is performed under plug flow conditions. Under plug flow conditions the flow through the tower is such that there is limited mixing of the grinding materials through the tower. This means that at different points along the length of the tower mill the viscosity of the aqueous environment will vary as the fineness of the microfibrillated cellulose increases. Thus, in effect, the grinding region in the tower mill can be considered to comprise one or more grinding zones which have a characteristic viscosity. A skilled person in the art will understand that there is no sharp boundary between adjacent grinding zones with respect to viscosity.

In an embodiment, water is added at the top of the mill proximate to the quiescent zone or the classifier or the screen above one or more grinding zones to reduce the viscosity of the aqueous suspension comprising microfibrillated cellulose and inorganic particulate material at those zones in the mill. By diluting the product microfibrillated cellulose and inorganic particulate material at this point in the mill it has been found that the prevention of grinding media carry over to the quiescent zone and/or the classifier and/or the screen is improved. Further, the limited mixing through the tower allows for processing at higher solids lower down the tower and dilute at the top with limited backflow of the dilution water back down the tower into the one or more grinding zones. Any suitable amount of water which is effective to dilute the viscosity of the product aqueous suspension comprising microfibrillated cellulose and inorganic particulate material may be added. The water may be added continuously during the grinding process, or at regular intervals, or at irregular intervals.

In another embodiment, water may be added to one or more grinding zones via one or more water injection points positioned along the length of the tower mill, or each water injection point being located at a position which corresponds to the one or more grinding zones. Advantageously, the ability to add water at various points along the tower allows for further adjustment of the grinding conditions at any or all positions along the mill.

The tower mill may comprise a vertical impeller shaft equipped with a series of impeller rotor disks throughout its length. The action of the impeller rotor disks creates a series of discrete grinding zones throughout the mill.

In another embodiment, the grinding is performed in a screened grinder, preferably a stirred media detritor. The screened grinder may comprise one or more screen(s) having a nominal aperture size of at least about 250 μm, for example, the one or more screens may have a nominal aperture size of at least about 300 μm, or at least about 350 μm, or at least about 400 μm, or at least about 450 μm, or at least about 500 μm, or at least about 550 μm, or at least about 600 μm, or at least about 650 μm, or at least about 700 μm, or at least about 750 μm, or at least about 800 μm, or at least about 850 μm, or at or least about 900 μm, or at least about 1000 μm.

The screen sizes noted immediately above are applicable to the tower mill embodiments described above.

As noted above, the grinding may be performed in the presence of a grinding medium. In an embodiment, the grinding medium is a coarse media comprising particles having an average diameter in the range of from about 1 mm to about 6 mm, for example about 2 mm, or about 3 mm, or about 4 mm, or about 5 mm.

In another embodiment, the grinding media has a specific gravity of at least about 2.5, for example, at least about 3, or at least about 3.5, or at least about 4.0, or at least about 4.5, or least about 5.0, or at least about 5.5, or at least about 6.0.

In another embodiment, the grinding media comprises particles having an average diameter in the range of from about 1 mm to about 6 mm and has a specific gravity of at least about 2.5.

In another embodiment, the grinding media comprises particles having an average diameter of about 3 mm and specific gravity of about 2.7.

As described above, the grinding medium (or media) may present in an amount up to about 70% by volume of the charge. The grinding media may be present in amount of at least about 10% by volume of the charge, for example, at least about 20% by volume of the charge, or at least about 30% by volume of the charge, or at least about 40% by volume of the charge, or at least about 50% by volume of the charge, or at least about 60% by volume of the charge.

In one embodiment, the grinding medium is present in amount of about 50% by volume of the charge.

By 'charge' is meant the composition which is the feed fed to the grinder vessel. The charge includes of water, grinding media, fibrous substrate comprising cellulose and inorganic particulate material, and any other optional additives as described herein.

The use of a relatively coarse and/or dense media has the advantage of improved (i.e., faster) sediment rates and reduced media carry over through the quiescent zone and/or classifier and/or screen(s).

A further advantage in using relatively coarse grinding media is that the mean particle size ($d_{50}$) of the inorganic particulate material may not be significantly reduced during the grinding process such that the energy imparted to the grinding system is primarily expended in microfibrillating the fibrous substrate comprising cellulose.

A further advantage in using relatively coarse screens is that a relatively coarse or dense grinding media can be used in the microfibrillating step. In addition, the use of relatively coarse screens (i.e., having a nominal aperture of least about 250 um) allows a relatively high solids product to be processed and removed from the grinder, which allows a relatively high solids feed (comprising fibrous substrate comprising cellulose and inorganic particulate material) to be processed in an economically viable process. As discussed below, it has been found that a feed having a high initial solids content is desirable in terms of energy sufficiency. Further, it has also been found that product produced (at a given energy) at lower solids has a coarser particle size distribution.

As discussed in the 'Background' section above, the present invention seeks to address the problem of preparing microfibrillated cellulose economically on an industrial scale.

Thus, in accordance with one embodiment, the fibrous substrate comprising cellulose and inorganic particulate material are present in the aqueous environment at an initial solids content of at least about 4 wt %, of which at least about 2% by weight is fibrous substrate comprising cellulose. The initial solids content may be at least about 10 wt %, or at least about 20 wt %, or at least about 30 wt %, or at least about at least 40 wt %. At least about 5% by weight of the initial solids content may be fibrous substrate comprising cellulose, for example, at least about 10%, or at least about 15%, or at least about 20% by weight of the initial solids content may be fibrous substrate comprising cellulose.

In another embodiment, the grinding is performed in a cascade of grinding vessels, one or more of which may comprise one or more grinding zones. For example, the fibrous substrate comprising cellulose and the inorganic particulate material may be ground in a cascade of two or more grinding vessels, for example, a cascade of three or more grinding vessels, or a cascade of four or more grinding vessels, or a cascade of five or more grinding vessels, or a cascade of six or more grinding vessels, or a cascade of seven or more grinding vessels, or a cascade of eight or more grinding vessels, or a cascade of nine or more grinding vessels in series, or a cascade comprising up to ten grinding vessels. The cascade of grinding vessels may be operatively linked in series or parallel or a combination of series and parallel. The output from and/or the input to one or more of the grinding vessels in the cascade may be subjected to one or more screening steps and/or one or more classification steps.

The total energy expended in a microfibrillation process may be apportioned equally across each of the grinding vessels in the cascade. Alternatively, the energy input may vary between some or all of the grinding vessels in the cascade.

A person skilled in the art will understand that the energy expended per vessel may vary between vessels in the cascade depending on the amount of fibrous substrate being microfibrillated in each vessel, and optionally the speed of grind in each vessel, the duration of grind in each vessel, the type of grinding media in each vessel and the type and amount of inorganic particulate material. The grinding conditions may be varied in each vessel in the cascade in order to control the particle size distribution of both the microfibrillated cellulose and the inorganic particulate material. For example, the grinding media size may be varied between successive vessels in the cascade in order to reduce grinding of the inorganic particulate material and to target grinding of the fibrous substrate comprising cellulose.

In an embodiment the grinding is performed in a closed circuit. In another embodiment, the grinding is performed in an open circuit. The grinding may be performed in batch mode. The grinding may be performed in a re-circulating batch mode.

As described above, the grinding circuit may include a pre-grinding step in which coarse inorganic particulate ground in a grinder vessel to a predetermined particle size distribution, after which fibrous material comprising cellulose is combined with the pre-ground inorganic particulate material and the grinding continued in the same or different grinding vessel until the desired level of microfibrillation has been obtained.

As the suspension of material to be ground may be of a relatively high viscosity, a suitable dispersing agent may preferably be added to the suspension prior to grinding. The dispersing agent may be, for example, a water soluble condensed phosphate, polysilicic acid or a salt thereof, or a polyelectrolyte, for example a water soluble salt of a poly (acrylic acid) or of a poly(methacrylic acid) having a number average molecular weight not greater than 80,000. The amount of the dispersing agent used would generally be in the range of from 0.1 to 2.0% by weight, based on the weight of the dry inorganic particulate solid material. The suspension may suitably be ground at a temperature in the range of from 4° C. to 100° C.

Other additives which may be included during the microfibrillation step include:

carboxymethyl cellulose, amphoteric carboxymethyl cellulose, oxidising agents, 2,2,6,6-Tetramethylpiperidine-1-oxyl (TEMPO), TEMPO derivatives, and wood degrading enzymes.

The pH of the suspension of material to be ground may be about 7 or greater than about 7 (i.e., basic), for example, the pH of the suspension may be about 8, or about 9, or about 10, or about 11. The pH of the suspension of material to be ground may be less than about 7 (i.e., acidic), for example, the pH of the suspension may be about 6, or about 5, or about 4, or about 3. The pH of the suspension of material to be ground may be adjusted by addition of an appropriate amount of acid or base. Suitable bases included alkali metal hydroxides, such as, for example NaOH. Other suitable bases are sodium carbonate and ammonia. Suitable acids included inorganic acids, such as hydrochloric and sulphuric acid, or organic acids. An exemplary acid is orthophosphoric acid.

The amount of inorganic particulate material and cellulose pulp in the mixture to be co-ground may vary in a ratio of from about 99.5:0.5 to about 0.5:99.5, based on the dry weight of inorganic particulate material and the amount of dry fibre in the pulp, for example, a ratio of from about 99.5:0.5 to about 50:50 based on the dry weight of inorganic particulate material and the amount of dry fibre in the pulp. For example, the ratio of the amount of inorganic particulate material and dry fibre may be from about 99.5:0.5 to about 70:30. In an embodiment, the ratio of inorganic particulate material to dry fibre is about 80:20, or for example, about 85:15, or about 90:10, or about 91:9, or about 92:8, or about 93:7, or about 94:6, or about 95:5, or about 96:4, or about 97:3, or about 98:2, or about 99:1. In a preferred embodiment, the weight ratio of inorganic particulate material to dry fibre is about 95:5. In another preferred embodiment, the weight ratio of inorganic particulate material to dry fibre is about 90:10. In another preferred embodiment, the weight ratio of inorganic particulate material to dry fibre is about 85:15. In another preferred embodiment, the weight ratio of inorganic particulate material to dry fibre is about 80:20.

The total energy input in a typical grinding process to obtain the desired aqueous suspension composition may typically be between about 100 and 1500 kWht$^{-1}$ based on the total dry weight of the inorganic particulate filler. The total energy input may be less than about 1000 kWht$^{-1}$, for example, less than about 800 kWht$^{-1}$, less than about 600 kWht$^{-1}$, less than about 500 kWht$^{-1}$, less than about 400 kWht$^{-1}$, less than about 300 kWht$^{-1}$, or less than about 200 kWht$^{-1}$. As such, the present inventors have surprisingly found that a cellulose pulp can be microfibrillated at relatively low energy input when it is co-ground in the presence of an inorganic particulate material. As will be apparent, the total energy input per tonne of dry fibre in the fibrous substrate comprising cellulose will be less than about 10,000 kWht$^{-1}$, for example, less than about 9000 kWht$^{-1}$, or less than about 8000 kWht$^{-1}$, or less than about 7000 kWht$^{-1}$, or less than about 6000 kWht$^{-1}$, or less than about 5000 kWht$^{-1}$, for example less than about 4000 kWht-1, less than about 3000 kWht$^{-1}$, less than about 2000 kWht$^{-1}$, less than about 1500 kWht$^{-1}$, less than about 1200 kWht$^{-1}$, less than about 1000 kWht$^{-1}$, or less than about 800 kWht$^{-1}$. The total energy input varies depending on the amount of dry fibre in the fibrous substrate being microfibrillated, and optionally the speed of grind and the duration of grind.

Homogenizing

Microfibrillation of the fibrous substrate comprising cellulose may be effected under wet conditions in the presence of the inorganic particulate material by a method in which the mixture of cellulose pulp and inorganic particulate material is pressurized (for example, to a pressure of about 500 bar) and then passed to a zone of lower pressure. The rate at which the mixture is passed to the low pressure zone is sufficiently high and the pressure of the low pressure zone is sufficiently low as to cause microfibrillation of the cellulose fibres. For example, the pressure drop may be effected by forcing the mixture through an annular opening that has a narrow entrance orifice with a much larger exit orifice. The drastic decrease in pressure as the mixture accelerates into a larger volume (i.e., a lower pressure zone) induces cavitation which causes microfibrillation. In an embodiment, microfibrillation of the fibrous substrate comprising cellulose may be effected in a homogenizer under wet conditions in the presence of the inorganic particulate material. In the homogenizer, the cellulose pulp-inorganic particulate material mixture is pressurized (for example, to a pressure of about 500 bar), and forced through a small nozzle or orifice. The mixture may be pressurized to a pressure of from about 100 to about 1000 bar, for example to a pressure of equal to or greater than 300 bar, or equal to or greater than about 500, or equal to or greater than about 200 bar, or equal to or greater than about 700 bar. The homogenization subjects the fibres to high shear forces such that as the pressurized cellulose pulp exits the nozzle or orifice, cavitation causes microfibrillation of the cellulose fibres in the pulp. Additional water may be added to improve flowability of the suspension through the homogenizer. The resulting aqueous suspension comprising microfibrillated cellulose and inorganic particulate material may be fed back into the inlet of the homogenizer for multiple passes through the homogenizer. In a preferred embodiment, the inorganic particulate material is a naturally platy mineral, such as kaolin. As such, homogenization not only facilitates microfibrillation of the cellulose pulp, but also facilitates delamination of the platy particulate material.

A platy particulate material, such as kaolin, is understood to have a shape factor of at least about 10, for example, at least about 15, or at least about 20, or at least about 30, or at least about 40, or at least about 50, or at least about 60, or at least about 70, or at least about 80, or at least about 90, or at least about 100. Shape factor, as used herein, is a measure of the ratio of particle diameter to particle thickness for a population of particles of varying size and shape as measured using the electrical conductivity methods, apparatuses, and equations described in U.S. Pat. No. 5,576,617, which is incorporated herein by reference.

A suspension of a platy inorganic particulate material, such as kaolin, may be treated in the homogenizer to a predetermined particle size distribution in the absence of the fibrous substrate comprising cellulose, after which the fibrous material comprising cellulose is added to the aqueous slurry of inorganic particulate material and the combined suspension is processed in the homogenizer as described above. The homogenization process is continued, including one or more passes through the homogenizer, until the desired level of microfibrillation has been obtained. Similarly, the platy inorganic particulate material may be treated in a grinder to a predetermined particle size distribution and then combined with the fibrous material comprising cellulose followed by processing in the homogenizer.

An exemplary homogenizer is a Manton Gaulin (APV) homogenizer.

After the microfibrillation step has been carried out, the aqueous suspension comprising microfibrillated cellulose and inorganic particulate material may be screened to remove fibre above a certain size and to remove any grinding medium. For example, the suspension can be subjected to screening using a sieve having a selected nominal aperture size in order to remove fibres which do not pass through the sieve. Nominal aperture size means the nominal central separation of opposite sides of a square aperture or the nominal diameter of a round aperture. The sieve may be a BSS sieve (in accordance with BS 1796) having a nominal aperture size of 150 µm, for example, a nominal aperture size 125 µm, or 106 µm, or 90 µm, or 74 µm, or 63 µm, or 53 µm, 45 µm, or 38 µm. In one embodiment, the aqueous suspension is screened using a BSS sieve having a nominal aperture of 125 µm. The aqueous suspension may then be optionally dewatered.

The Aqueous Suspension

The aqueous suspensions of this invention produced in accordance with the methods described above are suitable for use in a method of making paper or coating paper.

As such, the present invention is directed to an aqueous suspension comprising, consisting of, or consisting essentially of microfibrillated cellulose and an inorganic particulate material and other optional additives. The aqueous suspension is suitable for use in a method of making paper or coating paper. The other optional additives include dispersant, biocide, suspending aids, salt(s) and other additives, for example, starch or carboxy methyl cellulose or polymers, which may facilitate the interaction of mineral particles and fibres during or after grinding.

The inorganic particulate material may have a particle size distribution such that at least about 10% by weight, for example at least about 20% by weight, for example at least about 30% by weight, for example at least about 40% by weight, for example at least about 50% by weight, for example at least about 60% by weight, for example at least about 70% by weight, for example at least about 80% by weight, for example at least about 90% by weight, for example at least about 95% by weight, or for example about 100% of the particles have an e.s.d of less than 2 µm.

In another embodiment, the inorganic particulate material may have a particle size distribution, as measured by a Malvern Mastersizer S machine, such that at least about 10% by volume, for example at least about 20% by volume, for example at least about 30% by volume, for example at least about 40% by volume, for example at least about 50% by volume, for example at least about 60% by volume, for example at least about 70% by volume, for example at least about 80% by volume, for example at least about 90% by volume, for example at least about 95% by volume, or for example about 100% by volume of the particles have an e.s.d of less than 2 µm.

The amount of inorganic particulate material and cellulose pulp in the mixture to be co-ground may vary in a ratio of from about 99.5:0.5 to about 0.5:99.5, based on the dry weight of inorganic particulate material and the amount of dry fibre in the pulp, for example, a ratio of from about 99.5:0.5 to about 50:50 based on the dry weight of inorganic particulate material and the amount of dry fibre in the pulp. For example, the ratio of the amount of inorganic particulate material and dry fibre may be from about 99.5:0.5 to about 70:30. In an embodiment, the ratio of inorganic particulate material to dry fibre is about 80:20, or for example, about 85:15, or about 90:10, or about 91:9, or about 92:8, or about 93:7, or about 94:6, or about 95:5, or about 96:4, or about 97:3, or about 98:2, or about 99:1. In a preferred embodiment, the weight ratio of inorganic particulate material to dry fibre is about 95:5. In another preferred embodiment, the weight ratio of inorganic particulate material to dry fibre is about 90:10. In another preferred embodiment, the weight ratio of inorganic particulate material to dry fibre is about 85:15. In another preferred embodiment, the weight ratio of inorganic particulate material to dry fibre is about 80:20.

In an embodiment, the composition does not include fibres too large to pass through a BSS sieve (in accordance with BS 1796) having a nominal aperture size of 150 µm, for example, a nominal aperture size of 125 µm, 106 µm, or 90 µm, or 74 µm, or 63 µm, or 53 µm, 45 µm, or 38 µm. In one embodiment, the aqueous suspension is screened using a BSS sieve having a nominal aperture of 125 µm.

It will be understood therefore that amount (i.e., % by weight) of microfibrillated cellulose in the aqueous suspension after grinding or homogenizing may be less than the amount of dry fibre in the pulp if the ground or homogenized suspension is treated to remove fibres above a selected size. Thus, the relative amounts of pulp and inorganic particulate material fed to the grinder or homogenizer can be adjusted depending on the amount of microfibrillated cellulose that is required in the aqueous suspension after fibres above a selected size are removed.

In an embodiment, the inorganic particulate material is an alkaline earth metal carbonate, for example, calcium carbonate. The inorganic particulate material may be ground calcium carbonate (GCC) or precipitated calcium carbonate (PCC), or a mixture of GCC and PCC. In another embodiment, the inorganic particulate material is a naturally platy mineral, for example, kaolin. The inorganic particulate material may be a mixture of kaolin and calcium carbonate, for example, a mixture of kaolin and GCC, or a mixture of kaolin and PCC, or a mixture of kaolin, GCC and PCC.

In another embodiment, the aqueous suspension is treated to remove at least a portion or substantially all of the water to form a partially dried or essentially completely dried product. For example, at least about 10% by volume of water in the aqueous suspension may be removed from the aqueous suspension, for example, at least about 20% by volume, or at least about 30% by volume, or least about 40% by volume, or at least about 50% by volume, or at least about 60% by volume, or at least about 70% by volume or at least about 80% by volume or at least about 90% by volume, or at least about 100% by volume of water in the aqueous suspension may be removed. Any suitable technique can be used to remove water from the aqueous suspension including, for example, by gravity or vacuum-assisted drainage, with or without pressing, or by evaporation, or by filtration, or by a combination of these techniques. The partially dried or essentially completely dried product will comprise microfibrillated cellulose and inorganic particulate material and any other optional additives that may have been added to the aqueous suspension prior to drying. The partially dried or essentially completely dried product may be stored or packaged for sale. The partially dried or essentially completely dried product may be optionally re-hydrated and incorporated in papermaking compositions and other paper products, as described herein.

Paper Products and Processes for Preparing Same

The aqueous suspension comprising microfibrillated cellulose and inorganic particulate material can be incorporated in papermaking compositions, which in turn can be used to prepare paper products. The term paper product, as used in connection with the present invention, should be understood to mean all forms of paper, including board such as, for example, white-lined board and linerboard, cardboard, paperboard, coated board, and the like. There are numerous types of paper, coated or uncoated, which may be made according to the present invention, including paper suitable for books, magazines, newspapers and the like, and office papers. The paper may be calendered or super calendered as appropriate; for example super calendered magazine paper for rotogravure and offset printing may be made according to the present methods. Paper suitable for light weight coating (LWC), medium weight coating (MWC) or machine finished pigmentisation (MFP) may also be made according to the present methods. Coated paper and board having barrier properties suitable for food packaging and the like may also be made according to the present methods.

In a typical papermaking process, a cellulose-containing pulp is prepared by any suitable chemical or mechanical treatment, or combination thereof, which are well known in the art. The pulp may be derived from any suitable source such as wood, grasses (e.g., sugarcane, bamboo) or rags (e.g., textile waste, cotton, hemp or flax). The pulp may be bleached in accordance with processes which are well known to those skilled in the art and those processes suitable for use in the present invention will be readily evident. The bleached cellulose pulp may be beaten, refined, or both, to a predetermined freeness (reported in the art as Canadian standard freeness (CSF) in $cm^3$). A suitable paper stock is then prepared from the bleached and beaten pulp.

The papermaking composition of the present invention typically comprises, in addition to the aqueous suspension of microfibrillated cellulose and inorganic particulate material, paper stock and other conventional additives known in the art. The papermaking composition of the present invention may comprise up to about 50% by weight inorganic particulate material derived from the aqueous suspension comprising microfibrillated cellulose and inorganic particulate material based on the total dry contents of the papermaking composition. For example, the papermaking composition may comprise at least about 2% by weight, or at least about 5% by weight, or at least about 10% by weight, or at least about 15% by weight, or at least about 20% by weight, or at least about 25% by weight, or at least about 30% by weight, or at least about 35% by weight, or at least about 40% by weight, or at least about 45% by weight, or at least about 50% by weight, or at least about 60% by weight, or at least about 70% by weight, or at least about 80% by weight of inorganic particulate material derived from the aqueous suspension comprising microfibrillated cellulose and inorganic particulate material based on the total dry contents of the papermaking composition. The microfibrillated cellulose material may have a fibre steepness of greater than about 10, for examples, from about 20 to about 50, or from about 25 to about 40, or from about 25 to 35, or from about 30 to about 40. The papermaking composition may also contain a non-ionic, cationic or an anionic retention aid or microparticle retention system in an amount in the range from about 0.1 to 2% by weight, based on the dry weight of the aqueous suspension comprising microfibrillated cellulose and inorganic particulate material. It may also contain a sizing agent which may be, for example, a long chain alkylketene dimer, a wax emulsion or a succinic acid derivative. The composition may also contain dye and/or an optical brightening agent. The composition may also comprise dry and wet strength aids such as, for example, starch or epichlorhydrin copolymers.

In accordance with the eighth aspect described above, the present invention is directed to a process for making a paper product comprising: (i) obtaining or preparing a fibrous substrate comprising cellulose in the form of a pulp suitable for making a paper product; (ii) preparing a papermaking composition from the pulp in step (i), the aqueous suspension of this invention comprising microfibrillated cellulose and inorganic particulate material, and other optional additives (such as, for example, a retention aid, and other additives such as those described above); and (iii) forming a paper product from said papermaking composition. As noted above, the step of forming a pulp may take place in the grinder vessel or homogenizer by addition of the fibrous substrate comprising cellulose in a dry state, for example, in the form of a dry paper broke or waste, directly to the grinder vessel. The aqueous environment in the grinder vessel or homogenizer will then facilitate the formation of a pulp.

In one embodiment, an additional filler component (i.e., a filler component other than the inorganic particulate material which is co-ground with the fibrous substrate comprising cellulose) can be added to the papermaking composition prepared in step (ii). Exemplary filler components are PCC, GCC, kaolin, or mixtures thereof. An exemplary PCC is scalenohedral PCC. In an embodiment, the weight ratio of the inorganic particulate material to the additional filler component in the papermaking composition is from about 1:1 to about 1:30, for example, from about 1:1 to about 1:20, for example, from about 1:1 to about 1:15, for example from about 1:1 to about 1:10, for example from about 1:1 to about 1:7, for example, from about 1:3 to about 1:6, or about 1:1, or about 1:2, or about 1:3, or about 1:4, or about 1:5. Paper products made from such papermaking compositions may exhibit greater strength compared to paper products comprising only inorganic particulate material, such as for example PCC, as filler. Paper products made from such papermaking compositions may exhibit greater strength compared to a paper product in which inorganic particulate material and a fibrous substrate comprising cellulose are prepared (e.g., ground) separately and are admixed to form a paper making composition. Equally, paper products prepared from a papermaking composition according to the present invention may exhibit a strength which is comparable to paper products comprising less inorganic particulate material.

In other words, paper products can be prepared from a paper making composition according to the present at higher filler loadings without loss of strength.

The steps in the formation of a final paper product from a papermaking composition are conventional and well know in the art and generally comprise the formation of paper sheets having a targeted basis weight, depending on the type of paper being made.

Additional economic benefits can be achieved through the methods of the present invention in that the cellulose substrate for making the aqueous suspension can be derived from the same cellulose pulp formed for making the papermaking composition and the final paper product. As such, and in accordance with the ninth aspect described above, the present invention is directed to a an integrated process for making a paper product comprising: (i) obtaining or preparing a fibrous substrate comprising cellulose in the form of a pulp suitable for making a paper product; (ii) microfibrillating a portion of said fibrous substrate comprising cellulose in accordance with the first aspect of the invention to prepare an aqueous suspension comprising microfibrillated cellulose and inorganic particulate material; (iii) preparing a papermaking composition from the pulp in step (i), the aqueous suspension prepared in step (ii), and other optional additives; and (iv) forming a paper product from said papermaking composition.

Thus, since the cellulose substrate for preparing the aqueous suspension has already been prepared for the purpose of making the papermaking compositions, the step of forming the aqueous suspension does not necessarily require a separate step of preparing the fibrous substrate comprising cellulose.

Paper products prepared using the aqueous suspension of the present invention have surprisingly been found to exhibit improved physical and mechanical properties whilst at the same time enabling the inorganic particulate material to be incorporated at relatively high loading levels. Thus, improved papers can be prepared at relatively less cost. For example, paper products prepared from papermaking compositions comprising the aqueous suspension of the present invention have been found to exhibit improved retention of the inorganic particulate material filler compared to paper products which do not contain any microfibrillated cellulose. Paper products prepared from papermaking compositions comprising the aqueous suspension of the present invention have also been found to exhibit improved burst strength and tensile strength. Further, the incorporation of the microfibrillated cellulose has been found to reduce porosity compared to paper comprising the same amount of filler but no microfibrillated cellulose. This is advantageous since high filler loading levels are generally associated with relatively high values of porosity and are detrimental to printability.

Paper Coating Composition and Coating Process

The aqueous suspension of the present invention can be used as a coating composition without the addition of further additives. However, optionally, a small amount of thickener such as carboxymethyl cellulose or alkali-swellable acrylic thickeners or associated thickeners may be added.

The coating composition according to the present invention may contain one or more optional additional components, if desired. Such additional components, where present, are suitably selected from known additives for paper coating compositions. Some of these optional additives may provide more than one function in the coating composition. Examples of known classes of optional additives are as follows:

(a) one or more additional pigments: the compositions described herein can be used as sole pigments in the paper coating compositions, or may be used in conjunction with one another or with other known pigments, such as, for example, calcium sulphate, satin white, and so-called 'plastic pigment'. When a mixture of pigments is used, the total pigment solids content is preferably present in the composition in an amount of at least about 75 wt % of the total weight of the dry components of the coating composition;

(b) one or more binding or cobinding agents: for example, latex, which may, optionally, be carboxylated, including: a styrene-butadiene rubber latex; an acrylic polymer latex; a polyvinyl acetate latex; or a styrene acrylic copolymer latex, starch derivatives, sodium carboxymethyl cellulose, polyvinyl alcohol, and proteins;

(c) one or more cross linkers: for example, in levels of up to about 5% by weight;

e.g., glyoxals, melamine formaldehyde resins, ammonium zirconium carbonates; one or more dry or wet pick improvement additives: e.g., in levels up to about 2% by weight, e.g., melamine resin, polyethylene emulsions, urea formaldehyde, melamine formaldehyde, polyamide, calcium stearate, styrene maleic anhydride and others; one or more dry or wet rub improvement and abrasion resistance additives: e.g., in levels up to about 2% by weight, e.g., glyoxal based resins, oxidised polyethylenes, melamine resins, urea formaldehyde, melamine formaldehyde, polyethylene wax, calcium stearate and others; one or more water resistance additives: e.g., in levels up to about 2% by weight, e.g., oxidised polyethylenes, ketone resin, anionic latex, polyurethane, SMA, glyoxal, melamine resin, urea formaldehyde, melamine formaldehyde, polyamide, glyoxals, stearates and other materials commercially available for this function;

(d) one or more water retention aids: for example, in levels up to about 2% by weight, e.g., sodium carboxymethyl cellulose, hydroxyethyl cellulose, PVOH (polyvinyl alcohol), starches, proteins, polyacrylates, gums, alginates, polyacrylamide bentonite and other commercially available products sold for such applications;

(e) one or more viscosity modifiers and/or thickeners: for example, in levels up to about 2% by weight; e.g., acrylic associative thickeners, polyacrylates, emulsion copolymers, dicyanamide, triols, polyoxyethylene ether, urea, sulphated castor oil, polyvinyl pyrrolidone, CMC (carboxymethyl celluloses, for example sodium carboxymethyl cellulose), sodium alginate, xanthan gum, sodium silicate, acrylic acid copolymers, HMC (hydroxymethyl celluloses), HEC (hydroxyethyl celluloses) and others;

(f) one or more lubricity/calendering aids: for example, in levels up to about 2% by weight, e.g., calcium stearate, ammonium stearate, zinc stearate, wax emulsions, waxes, alkyl ketene dimer, glycols; one or more gloss-ink hold-out additives: e.g., in levels up to about 2% by weight, e.g., oxidised polyethylenes, polyethylene emulsions, waxes, casein, guar gum, CMC, HMC, calcium stearate, ammonium stearate, sodium alginate and others;

(g) one or more dispersants: the dispersant is a chemical additive capable, when present in a sufficient amount, of acting on the particles of the particulate inorganic material to prevent or effectively restrict flocculation or agglomeration of the particles to a desired extent, according to normal processing requirements. The dispersant may be present in levels up to about 1% by weight, and includes, for example, polyelectrolytes such as polyacrylates and copolymers containing polyacrylate species, especially polyacrylate salts (e.g., sodium and aluminium optionally with a group II metal salt), sodium hexametaphosphates, non-ionic polyol, polyphosphoric acid, condensed sodium phosphate, non-ionic surfactants, alkanolamine and other reagents commonly used for this function. The dispersant may, for example, be selected from conventional dispersant materials commonly used in the processing and grinding of inorganic particulate materials. Such dispersants will be well recognised by those skilled in this art. They are generally water-soluble salts capable of supplying anionic species which in their effective amounts can adsorb on the surface of the inorganic particles and thereby inhibit aggregation of the particles. The unsolvated salts suitably include alkali metal cations such as sodium. Salvation may in some cases be assisted by making the aqueous suspension slightly alkaline. Examples of suitable dispersants include: water soluble condensed phosphates, e.g., polymetaphosphate salts [general form of the sodium salts: $(NaPO_3)_x$] such as tetrasodium metaphosphate or so-called "sodium hexametaphosphate" (Graham's salt); water-soluble salts of polysilicic acids; polyelectrolytes; salts of homopolymers or copolymers of acrylic acid or methacrylic acid, or salts of polymers of other derivatives of acrylic acid, suitably having a weight average molecular mass of less than about 20,000. Sodium hexametaphosphate and sodium polyacrylate, the latter suitably having a weight average molecular mass in the range of about 1,500 to about 10,000, are especially preferred;

(h) one or more antifoamers and defoamers: for example, in levels up to about 1% by weight, e.g., blends of surfactants, tributyl phosphate, fatty polyoxyethylene esters plus fatty alcohols, fatty acid soaps, silicone emulsions and other silicone containing compositions, waxes and inorganic particulates in mineral oil, blends of emulsified hydrocarbons and other compounds sold commercially to carry out this function;

(i) one or more optical brightening agents (OBA) and fluorescent whitening agents (FWA): for example, in levels up to about 1% by weight, e.g., stilbene derivatives;

(j) one or more dyes: for example, in levels up to about 0.5% by weight;

(k) one or more biocides/spoilage control agents: for example, in levels up to about 1% by weight, e.g., oxidizing biocides such as chlorine gas, chlorine dioxide gas, sodium hypochlorite, sodium hypobromite, hydrogen, peroxide, peracetic oxide, ammonium bromide/sodium hypochlorite, or non-oxidising biocides such as GLUT (Glutaraldehyde, CAS No 90045-36-6), ISO(CIT/MIT) (Isothiazolinone, CAS No 55956-84-9 & 96118-96-6), ISO(BIT/MIT) (Isothiazolinone), ISO (BIT) (Isothiazolinone, CAS No 2634-33-5), DBNPA, BNPD (Bronopol), NaOPP, CARBAMATE, THIONE (Dazomet),EDDM—dimethanol (O-formal), HT—Triazine (N-formal), THPS—tetrakis (O-formal), TMAD—diurea (N-formal), metaborate, sodium dodecylbenene sulphonate, thiocyanate, organosulphur, sodium benzoate and other compounds sold commercially for this function, e.g., the range of biocide polymers sold by Nalco;

(l) one or more levelling and evening aids: for example, in levels up to about 2% by weight, e.g., non-ionic polyol, polyethylene emulsions, fatty acid, esters and alcohol derivatives, alcohol/ethylene oxide, calcium stearate and other compounds sold commercially for this function;

(m) one or more grease and oil resistance additives: for example, in levels up to about 2% by weight, e.g., oxidised polyethylenes, latex, SMA (styrene maleic anhydride), polyamide, waxes, alginate, protein, CMC, and HMC.

Any of the above additives and additive types may be used alone or in admixture with each other and with other additives, if desired.

For all of the above additives, the percentages by weight quoted are based on the dry weight of inorganic particulate material (100%) present in the composition. Where the additive is present in a minimum amount, the minimum amount may be about 0.01% by weight based on the dry weight of pigment.

The coating process is carried out using standard techniques which are well known to the skilled person. The coating process may also involve calendaring or supercalendering the coated product.

Methods of coating paper and other sheet materials, and apparatus for performing the methods, are widely published and well known. Such known methods and apparatus may conveniently be used for preparing coated paper. For example, there is a review of such methods published in Pulp and Paper International, May 1994, page 18 et seq.

Sheets may be coated on the sheet forming machine, i.e., "on-machine," or "off-machine" on a coater or coating machine. Use of high solids compositions is desirable in the coating method because it leaves less water to evaporate subsequently. However, as is well known in the art, the solids level should not be so high that high viscosity and leveling problems are introduced. The methods of coating may be performed using an apparatus comprising (i) an application for applying the coating composition to the material to be coated and (ii) a metering device for ensuring that a correct level of coating composition is applied. When an excess of coating composition is applied to the applicator, the metering device is downstream of it. Alternatively, the correct amount of coating composition may be applied to the applicator by the metering device, e.g., as a film press. At the points of coating application and metering, the paper web support ranges from a backing roll, e.g., via one or two applicators, to nothing (i.e., just tension). The time the coating is in contact with the paper before the excess is finally removed is the dwell time—and this may be short, long or variable.

The coating is usually added by a coating head at a coating station. According to the quality desired, paper grades are uncoated, single-coated, double-coated and even triple-coated. When providing more than one coat, the initial coat (precoat) may have a cheaper formulation and optionally coarser pigment in the coating composition. A coater that is applying coating on each side of the paper will have two or four coating heads, depending on the number of coating layers applied on each side. Most coating heads coat only one side at a time, but some roll coaters (e.g., film presses, gate rolls, and size presses) coat both sides in one pass.

Examples of known coaters which may be employed include, without limitation, air knife coaters, blade coaters, rod coaters, bar coaters, multi-head coaters, roll coaters, roll or blade coaters, cast coaters, laboratory coaters, gravure coaters, kisscoaters, liquid application systems, reverse roll coaters, curtain coaters, spray coaters and extrusion coaters.

Water may be added to the solids comprising the coating composition to give a concentration of solids which is preferably such that, when the composition is coated onto a sheet to a desired target coating weight, the composition has a rheology which is suitable to enable the composition to be coated with a pressure (i.e., a blade pressure) of between 1 and 1.5 bar.

Calendering is a well known process in which paper smoothness and gloss is improved and bulk is reduced by passing a coated paper sheet between calender nips or rollers one or more times. Usually, elastomer-coated rolls are employed to give pressing of high solids compositions. An elevated temperature may be applied. One or more (e.g., up to about 12, or sometimes higher) passes through the nips may be applied.

Coated paper products prepared in accordance with the present invention and which contain optical brightening agent in the coating may exhibit a brightness as measured according to ISO Standard 11475 which is at least 2 units greater, for example at least 3 units greater compared to a coated paper product which does not comprise microfibrillated cellulose which has been prepared in accordance with the present invention. Coated paper products prepared in accordance with the present invention may exhibit a Parker Print Surf smoothness measured according to ISO standard 8971-4 (1992) which is at least 0.5 µm smoother, for example at least about 0.6 µm smoother, or at least about 0.7 µm smoother compared to a coated paper product which does not comprise microfibrillated cellulose which has been prepared in accordance with the present invention.

Microfibrillation in the Absence of Grindable Inorganic Particulate Material

In another aspect, the present invention is directed to a method for preparing an aqueous suspension comprising microfibrillated cellulose, the method comprising a step of microfibrillating a fibrous substrate comprising cellulose in an aqueous environment by grinding in the presence of a grinding medium which is to be removed after the completion of grinding, wherein the grinding is performed in a tower mill or a screened grinder, and wherein the grinding is carried out in the absence of grindable inorganic particulate material.

A grindable inorganic particulate material is a material which would be ground in the presence of the grinding medium.

The particulate grinding medium may be of a natural or a synthetic material. The grinding medium may, for example, comprise balls, beads or pellets of any hard mineral, ceramic or metallic material. Such materials may include, for example, alumina, zirconia, zirconium silicate, aluminium silicate or the mullite-rich material which is produced by calcining kaolinitic clay at a temperature in the range of from about 1300° C. to about 1800° C. For example, in some embodiments a Carbolite® grinding media is preferred. Alternatively, particles of natural sand of a suitable particle size may be used.

Generally, the type of and particle size of grinding medium to be selected for use in the invention may be dependent on the properties, such as, e.g., the particle size of, and the chemical composition of, the feed suspension of material to be ground. Preferably, the particulate grinding medium comprises particles having an average diameter in the range of from about 0.5 mm to about 6 mm. In one embodiment, the particles have an average diameter of at least about 3 mm.

The grinding medium may comprise particles having a specific gravity of at least about 2.5. The grinding medium may comprise particles have a specific gravity of at least about 3, or least about 4, or least about 5, or at least about 6.

The grinding medium (or media) may be present in an amount up to about 70% by volume of the charge. The grinding media may be present in amount of at least about 10% by volume of the charge, for example, at least about 20% by volume of the charge, or at least about 30% by volume of the charge, or at least about 40% by volume of the charge, or at least about 50% by volume of the charge, or at least about 60% by volume of the charge.

The fibrous substrate comprising cellulose may be microfibrillated to obtain microfibrillated cellulose having a $d_{50}$ ranging from about 5 to µm about 500 µm, as measured by laser light scattering. The fibrous substrate comprising cellulose may be microfibrillated to obtain microfibrillated cellulose having a $d_{50}$ of equal to or less than about 400 µm, for example equal to or less than about 300 µm, or equal to or less than about 200 µm, or equal to or less than about 150 µm, or equal to or less than about 125 µm, or equal to or less than about 100 µm, or equal to or less than about 90 µm, or equal to or less than about 80 µm, or equal to or less than about 70 µm, or equal to or less than about 60 µm, or equal to or less than about 50 µm, or equal to or less than about 40 µm, or equal to or less than about 30 µm, or equal to or less than about 20 µm, or equal to or less than about 10 µm.

The fibrous substrate comprising cellulose may be microfibrillated to obtain microfibrillated cellulose having a modal fibre particle size ranging from about 0.1-500 µm. The fibrous substrate comprising cellulose may be microfibrillated in the presence to obtain microfibrillated cellulose having a modal fibre particle size of at least about 0.5 µm, for example at least about 10 µm, or at least about 50 µm, or at least about 100 µm, or at least about 150 µm, or at least about 200 µm, or at least about 300 µm, or at least about 400 µm.

The fibrous substrate comprising cellulose may be microfibrillated to obtain microfibrillated cellulose having a fibre steepness equal to or greater than about 10, as measured by Malvern. Fibre steepness (i.e., the steepness of the particle size distribution of the fibres) is determined by the following formula:

$$\text{Steepness} = 100 \times (d_{30}/d_{70})$$

The microfibrillated cellulose may have a fibre steepness equal to or less than about 100. The microfibrillated cellulose may have a fibre steepness equal to or less than about 75, or equal to or less than about 50, or equal to or less than about 40, or equal to or less than about 30. The microfibrillated cellulose may have a fibre steepness from about 20 to about 50, or from about 25 to about 40, or from about 25 to about 35, or from about 30 to about 40.

In one embodiment, the grinding vessel is a tower mill. The tower mill may comprise a quiescent zone above one or more grinding zones. A quiescent zone is a region located towards the top of the interior of a tower mill in which minimal or no grinding takes place and comprises microfibrillated cellulose and inorganic particulate material. The quiescent zone is a region in which particles of the grinding medium sediment down into the one or more grinding zones of the tower mill.

The tower mill may comprise a classifier above one or more grinding zones. In an embodiment, the classifier is top mounted and located adjacent to a quiescent zone. The classifier may be a hydrocyclone.

The tower mill may comprise a screen above one or more grind zones. In an embodiment, a screen is located adjacent to a quiescent zone and/or a classifier. The screen may be sized to separate grinding media from the product aqueous suspension comprising microfibrillated cellulose and to enhance grinding media sedimentation.

In an embodiment, the grinding is performed under plug flow conditions. Under plug flow conditions the flow through the tower is such that there is limited mixing of the grinding materials through the tower. This means that at different points along the length of the tower mill the viscosity of the aqueous environment will vary as the fineness of the microfibrillated cellulose increases. Thus, in effect, the grinding region in the tower mill can be considered to comprise one or more grinding zones which have a characteristic viscosity. A skilled person in the art will understand that there is no sharp boundary between adjacent grinding zones with respect to viscosity.

In an embodiment, water is added at the top of the mill proximate to the quiescent zone or the classifier or the screen above one or more grinding zones to reduce the viscosity of the aqueous suspension comprising microfibrillated cellulose at those zones in the mill. By diluting the product microfibrillated cellulose at this point in the mill it has been found that the prevention of grinding media carry over to the quiescent zone and/or the classifier and/or the screen is improved. Further, the limited mixing through the tower allows for processing at higher solids lower down the tower and dilute at the top with limited backflow of the dilution water back down the tower into the one or more grinding zones. Any suitable amount of water which is effective to dilute the viscosity of the product aqueous suspension comprising microfibrillated cellulose may be added. The water may be added continuously during the grinding process, or at regular intervals, or at irregular intervals.

In another embodiment, water may be added to one or more grinding zones via one or more water injection points positioned along the length of the tower mill, the or each water injection point being located at a position which corresponds to the one or more grinding zones. Advantageously, the ability to add water at various points along the tower allows for further adjustment of the grinding conditions at any or all positions along the mill.

The tower mill may comprise a vertical impeller shaft equipped with a series of impeller rotor disks throughout its length. The action of the impeller rotor disks creates a series of discrete grinding zones throughout the mill.

In another embodiment, the grinding is performed in a screened grinder, preferably a stirred media detritor. The screened grinder may comprise one or more screen(s) having a nominal aperture size of at least about 250 μm, for example, the one or more screens may have a nominal aperture size of at least about 300 μm, or at least about 350 μm, or at least about 400 μm, or at least about 450 μm, or at least about 500 μm, or at least about 550 μm, or at least about 600 μm, or at least about 650 μm, or at least about 700 μm, or at least about 750 μm, or at least about 800 μm, or at least about 850 μm, or at or least about 900 μm, or at least about 1000 μm.

The screen sizes noted immediately above are applicable to the tower mill embodiments described above.

As noted above, the grinding is performed in the presence of a grinding medium. In an embodiment, the grinding medium is a coarse media comprising particles having an average diameter in the range of from about 1 mm to about 6 mm, for example about 2 mm, or about 3 mm, or about 4 mm, or about 5 mm.

In another embodiment, the grinding media has a specific gravity of at least about 2.5, for example, at least about 3, or at least about 3.5, or at least about 4.0, or at least about 4.5, or least about 5.0, or at least about 5.5, or at least about 6.0.

As described above, the grinding medium (or media) may be in an amount up to about 70% by volume of the charge. The grinding media may be present in amount of at least about 10% by volume of the charge, for example, at least about 20% by volume of the charge, or at least about 30% by volume of the charge, or at least about 40% by volume of the charge, or at least about 50% by volume of the charge, or at least about 60% by volume of the charge.

In one embodiment, the grinding medium is present in amount of about 50% by volume of the charge.

By 'charge' is meant the composition which is the feed fed to the grinder vessel. The charge includes water, grinding media, the fibrous substrate comprising cellulose and any other optional additives (other than as described herein).

The use of a relatively coarse and/or dense media has the advantage of improved (i.e., faster) sediment rates and reduced media carry over through the quiescent zone and/or classifier and/or screen(s).

A further advantage in using relatively coarse screens is that a relatively coarse or dense grinding media can be used in the microfibrillating step. In addition, the use of relatively coarse screens (i.e., having a nominal aperture of least about 250 um) allows a relatively high solids product to be processed and removed from the grinder, which allows a relatively high solids feed (comprising fibrous substrate comprising cellulose and inorganic particulate material) to be processed in an economically viable process. As discussed below, it has been found that a feed having a high initial solids content is desirable in terms of energy sufficiency. Further, it has also been found that product produced (at a given energy) at lower solids has a coarser particle size distribution.

As discussed in the 'Background' section above, the present invention seeks to address the' problem of preparing microfibrillated cellulose economically on an industrial scale.

Thus, in accordance with one embodiment, the fibrous substrate comprising cellulose is present in the aqueous environment at an initial solids content of at least about 1 wt %. The fibrous substrate comprising cellulose may be present in the aqueous environment at an initial solids content of at least about 2 wt %, for example at least about 3 wt %, or at least about at least 4 wt %. Typically the initial solids content will be no more than about 10 wt %.

In another embodiment, the grinding is performed in a cascade of grinding vessels, one or more of which may comprise one or more grinding zones. For example, the fibrous substrate comprising cellulose may be ground in a cascade of two or more grinding vessels, for example, a cascade of three or more grinding vessels, or a cascade of four or more grinding vessels, or a cascade of five or more grinding vessels, or a cascade of six or more grinding vessels, or a cascade of seven or more grinding vessels, or a cascade of eight or more grinding vessels, or a cascade of nine or more grinding vessels in series, or a cascade comprising up to ten grinding vessels. The cascade of grinding vessels may be operatively inked in series or parallel or a combination of series and parallel. The output from and/or the input to one or more of the grinding vessels in the cascade may be subjected to one or more screening steps and/or one or more classification steps.

The total energy expended in a microfibrillation process may be apportioned equally across each of the grinding vessels in the cascade. Alternatively, the energy input may vary between some or all of the grinding vessels in the cascade.

A person skilled in the art will understand that the energy expended per vessel may vary between vessels in the cascade depending on the amount of fibrous substrate being microfibrillated in each vessel, and optionally the speed of grind in each vessel, the duration of grind in each vessel and the type of grinding media in each vessel. The grinding conditions may be varied in each vessel in the cascade in order to control the particle size distribution of the microfibrillated cellulose.

In an embodiment the grinding is performed in a closed circuit. In another embodiment, the grinding is performed in an open circuit.

As the suspension of material to be ground may be of a relatively high viscosity, a suitable dispersing agent may preferably be added to the suspension prior to grinding. The dispersing agent may be, for example, a water soluble condensed phosphate, polysilicic add or a salt thereof, or a polyelectrolyte, for example a water soluble salt of a poly (acrylic add) or of a poly(methacrylic add) having a number average molecular weight not greater than 80,000. The amount of the dispersing agent used would generally be in the range of from 0.1 to 2.0% by weight, based on the weight of the dry inorganic particulate solid material. The suspension may suitably be ground at a temperature in the range of from 4° C. to 100° C.

Other additives which may be included during the microfibrillation step include: carboxymethyl cellulose, amphoteric carboxymethyl cellulose, oxidising agents, 2,2,6,6-Tetramethylpiperidine-1-oxyl (TEMPO), TEMPO derivatives, and wood degrading enzymes.

The pH of the suspension of material to be ground may be about 7 or greater than about 7 (i.e., basic), for example, the pH of the suspension may be about 8, or about 9, or about 10, or about 11. The pH of the suspension of material to be ground may be less than about 7 (i.e., acidic), for example, the pH of the suspension may be about 6, or about 5, or about 4, or about 3. The pH of the suspension of material to be ground may be adjusted by addition of an appropriate amount of acid or base. Suitable bases included alkali metal hydroxides, such as, for example NaOH. Other suitable bases are sodium carbonate and ammonia. Suitable acids included inorganic acids, such as hydrochloric and sulphuric acid, or organic acids. An exemplary acid is orthophosphoric acid.

The total energy input in a typical grinding process to obtain the desired aqueous suspension composition may typically be between about 100 and 1500 kWht$^{-1}$ based on the total dry weight of the inorganic particulate filler. The total energy input may be less than about 1000 kWh$^{-1}$, for example, less than about 800 kWht$^{-1}$, less than about 600 kWht$^{-1}$, less than about 500 kWht$^{-1}$, less than about 400 kWht$^{-1}$, less than about 300 kWht$^{-1}$, or less than about 200 kWht$^{-1}$. As such, the present inventors have surprisingly found that a cellulose pulp can be microfibrillated at relatively low energy input when it is co-ground in the presence of an inorganic particulate material. As will be apparent, the total energy input per tonne of dry fibre in the fibrous substrate comprising cellulose will be less than about 10,000 kWht$^{-1}$, for example, less than about 9000 kWht$^{-1}$, or less than about 8000 kWht$^{-1}$, or less than about 7000 kWht$^{-1}$, or less than about 6000 kWht$^{-1}$, or less than about 5000 kWht$^{-1}$, for example less than about 4000 kWht-1, less than about 3000 kWht$^{-1}$, less than about 2000 kWht$^{-1}$, less than about 1500 kWht$^{-1}$, less than about 1200 kWht$^{-1}$, less than about 1000 kWht$^{-1}$, or less than about 800 kWht$^{-1}$. The total energy input varies depending on the amount of dry fibre in the fibrous substrate being microfibrillated, and optionally the speed of grind and the duration of grind.

Embodiments of the present invention will now be described by way of illustration only, with reference to the following examples.

EXAMPLES

The following procedure we use to characterise the particle size distributions of mixtures of minerals (GCC or kaolin) and microfibrillated cellulose pulp fibres.
Calcium Carbonate A sample of co-ground slurry sufficient to give 3 g dry material is weighed into a beaker, diluted to 60 g with deionised water, and mixed with 5 cm$^3$ of a solution of sodium polyacrylate of 1.5 w/v % active. Further deionised water is added with stirring to a final slurry weight of 80 g.
Kaolin A sample of co-ground slurry sufficient to give 5 g dry material is weighed into a beaker, diluted to 60 g with deionised water, and mixed with 5 cm$^3$ of a solution of 1.0 wt % sodium carbonate and 0.5 wt % sodium hexametaphosphate. Further deionised water is added with stirring to a final slurry weight of 80 g.

The slurry is then added in 1 cm$^3$ aliquots to water in the sample preparation unit attached to the Mastersizer S until the optimum level of obscuration is displayed (normally 10-15%). The light scattering analysis procedure is then carried out. The instrument range selected was 300RF: 0.05-900, and the beam length set to 2.4 mm.

For co-ground samples containing calcium carbonate and fibre the refractive index for calcium carbonate (1.596) was used. For co-ground samples of kaolin and fibre the RI for kaolin (1.5295) was used.

The particle size distribution was calculated from Mie theory and gave the output as a differential volume based distribution. The presence of two distinct peaks was interpreted as arising from the mineral (finer peak) and fibre (coarser peak).

The finer mineral peak was fitted to the measured data points and subtracted mathematically from the distribution to leave the fibre peak, which was converted to a cumulative distribution. Similarly, the fibre peak was subtracted mathematically from the original distribution to leave the mineral peak, which was also converted to a cumulative distribution. Both these cumulative curves were then used to calculate the mean particle size ($d_{50}$) and the steepness of the distribution ($d_{30}/d_{70} \times 100$). The differential curve was used to find the modal particle size for both the mineral and fibre fractions.

Example 1

400 cm$^3$ water and 750 g of marble flour (10 wt %<2 µm particle size, by Sedigraph) were introduced into a grinding vessel and 1.5 kg of ceramic grinding media (Carbolite® 16/20, available from CARBO Ceramics Inc.) added. The mixture was stirred at 950 rpm for 60 minutes. The media was separated from the slurry and a small sample was removed to check the particle size (using a Micromeritics Sedigraph®) which was 57 wt %<2 µm.

The same grinder was used for each of the Examples. This grinder is a vertical mill comprising a cylindrical grinding vessel having an internal diameter of 14.5 cm and a vertical impeller shaft having a circular cross section and a diameter 1.8 cm. The shaft is equipped with 4 impellers positioned in an X design. The impellers have a circular cross section and a diameter 1.8 cm. The impellers are 6.5 cm long measured from the centre of the vertical shaft to the impeller tip.

Example 2

400 cm$^3$ water and 750 g of marble flour (11-15 wt %<2 µm particle size, by Sedigraph) were introduced into a grinding vessel and 1.5 kg of ceramic grinding media (Carbolite® 16/20, available from CARBO Ceramics Inc.) added. The mixture was stirred at 950 rpm for 30 minutes. A small sample was removed and the particle size of the product was measured (using a Micromeritics Sedigraph®) at 57 wt %<2 µm. An aliquot of bleached softwood pulp beaten in a Valley beater to a Canadian Standard Freeness (CSF) of 520 cm$^3$ was filtered through a screen in order to obtain a wet sheet at 20 wt % solids containing 37.5 dry g fibre. This sheet was added to the grinder and milling continued at 950 rpm for a further 30 minutes. 200 cm$^3$ of water was added during the grinding. The media was separated from the slurry, and the fibres greater than 38 µm removed using a BSS sieve having a mesh number of 400. The particle size of the filler composition was measured (using a Micromeritics Sedigraph®) and gave a result of 48 wt %<2 µm.

Example 3

The procedure described in Example 2 was repeated, this time continuing the second milling stage for 60 minutes. 200 cm³ of water was added during the grinding. The particle size distribution of the product was measured and gave a value of 42 wt %<2 µm.

Example 4

The procedure described in Example 2 was repeated, this time continuing the second milling stage for 120 minutes. 650 cm³ of water was added during the grinding. The particle size distribution of the product was measured and gave a value of 40 wt %<2 µm.

Example 5

The procedure described in Example 2 was repeated, this time continuing the second milling stage for 260 minutes. 1270 cm³ of water was added during the grinding. The particle size distribution of the product was measured and gave a value of 40 wt %<2 µm.

Example 6

The procedure described in Example 2 was repeated, this time continuing the second milling stage for 380 minutes. 1380 cm³ of water was added during the grinding. The particle size distribution of the product was measured and gave a value of 57 wt %<2 µm.

Example 7

Evaluation of the Products as Fillers in Paper

Some of the products prepared according to the above examples were tested as fillers in paper handsheets. A batch of bleached chemical softwood pulp was used which was beaten in a Valley beater to give a CSF of 520 cm³. After disintegration and dilution to 2% thick stock, the fibre was diluted to 0.3 wt % consistency for sheet making. Filler slurry was added together with retention aid (Ciba Percol 292, 0.02 wt % on furnish). Handsheets were made to a basis weight of 80 gm$^{-2}$ using a British handsheet mold according to standard methods, e.g., TAPPI T205 or SCAN C 26:76 (M 5:76).

The retention values of the fillers are listed below in Table 1, and show that the co-ground fillers have superior retention to the control filler.

TABLE 1

| First pass retention values | | |
|---|---|---|
| Ex. 1 control | Ex. 2 co-ground | Ex. 3 co-ground |
| 51% | 63% | 63% |

Two separate sheet making studies were performed and the results are given in Tables 2 and 3 below. Paper properties are interpolated at 30 wt % loading and were measured according to standard test methods, e.g., TAPPI T220 or SCAN C28:76 (M 8:76).

Burst strength: Messemer Büchnel burst tester according to SCAN P 24.
Tensile strength: Testometrics tensile tester according to SCAN P 16.
Bendtsen porosity: Measured using a Bendtsen Model 5 porosity tester in accordance with SCAN P21, SCAN P60, BS 4420 and Tappi UM 535.
Bulk: This is the reciprocal of the apparent density as measured according to SCAN P7.
ISO Brightness: The ISO brightness of handsheets was measured by means of an Elrepho Datacolour 3300 brightness meter fitted with a No. 8 filter (457 nm wavelength), according to ISO 2470: 1999 E.
Opacity: The opacity of a sample of paper is measured by means of an Elrepho Datacolor 3300 spectro-photometer using a wavelength appropriate to opacity measurement. The standard test method is ISO 2471. First, a measurement of the percentage of the incident light reflected is made with a stack of at least ten sheets of paper over a black cavity (Rinfinity). The stack of sheets is then replaced with a single sheet of paper, and a second measurement of the percentage reflectance of the single sheet on the black cover is made (R). The percentage opacity is then calculated from the formula: Percentage opacity=100×R/Rinfinity.

TABLE 2

| Filler | Burst Index Nm g$^{-1}$ | Burst strength % unfilled | Tensile index Nm g$^{-1}$ | Tensile strength % unfilled | Bendtsen porosity cm³ min$^{-1}$ | Bulk cm³ g$^{-1}$ | Brightness F8 | % Opacity F10 |
|---|---|---|---|---|---|---|---|---|
| Unfilled | 54 | 100 | 59.5 | 100 | 790 | 1.64 | 84.9 | 74.0 |
| Ex. 1 | 11 | 21.0 | 14 | 26.0 | 1900 | 1.53 | 90.6 | 89.0 |
| Ex. 2 | 18 | 31.0 | 24 | 40.5 | 1490 | 1.51 | 89.3 | 88.1 |
| Ex. 3 | 15 | 28.0 | 23 | 39.0 | 1490 | 1.49 | 89.0 | 88.1 |

TABLE 3

| Filler | Burst Index Nm g$^{-1}$ | Burst strength % unfilled | Tensile index Nm g$^{-1}$ | Tensile strength % unfilled | Bendtsen porosity cm³ min$^{-1}$ | Bulk cm³ g$^{-1}$ | Brightness F8 | % Opacity F10 |
|---|---|---|---|---|---|---|---|---|
| Unfilled | 55.5 | 100 | 63 | 100 | 650 | 1.59 | 85.5 | 73.7 |
| Ex. 1 | 9.5 | 17.5 | 15 | 25.0 | 2250 | 1.55 | 90.7 | 88.9 |
| Ex. 4 | 15 | 26.0 | 22.5 | 35.0 | 700 | 1.46 | 90.5 | 88.5 |
| Ex. 5 | 16 | 30.0 | 23 | 35.0 | 500 | 1.44 | 90.1 | 88.9 |
| Ex. 6 | 16 | 30.0 | 24 | 39.0 | 400 | 1.45 | 89.7 | 89.4 |

Example 8

4 dry kg of a kaolin filler, Intramax® 57, was dispersed in 6000 cm$^3$ water using a high energy mixer. The pH was 4.8. This was used as a stock suspension for further experiments. The particle size distribution was measured (using a Micromeritics Sedigraph®) and gave values of 57 wt %<2 μm, and 38 wt %<1 μm.

Example 9

2 kg of the above stock suspension of kaolin was processed for 5 passes through a Manton Gaulin (APV) homogeniser at a pressure of 500 bar. The resulting product was used as a control in further papermaking tests. The particle size distribution was measured (using a Micromeritics Sedigraph®) and gave values of 62 wt %<2 μm, and 43 wt %<1 μm.

Example 10

A further 2 kg of the stock kaolin suspension was placed on a high energy mixer. A suspension of bleached softwood pulp was beaten on a Valley beater to a CSF of 520 cm$^3$ and this was filtered on a standard consistency tester to give a wet sheet at 15% dry solids. 133.5 g of this wet pulp was added to the kaolin suspension and stirred until the fibres were well mixed with the kaolin, to give a level of 2.5 wt % dry pulp on dry kaolin. 440 cm$^3$ of water was also added to improve flowability. This suspension at 33 wt % solids was then passed through the Gaulin homogeniser under the same conditions as Example 9. The particle size distribution of the product was measured (using a Micromeritics Sedigraph®) and gave values of 62 wt %<2 μm, and 45 wt %<1 μm.

Example 11

The procedure described in Example 10 was repeated, this time adding 267 g wet pulp to 2 kg stock kaolin suspension, to give a level of 5 wt % dry pulp on dry kaolin. The suspension was also diluted to about 30 wt % solids with 440 cm$^3$ water, and the suspension processed through the homogeniser using the same conditions as Examples 9 and 10. The particle size distribution was measured (using a Micromeritics Sedigraph®) and gave values of 58.5 wt %<2 μm, and 42 wt %<1 μm.

Example 12

Evaluation of the Products as Fillers in Paper

The products prepared according to the above examples were tested as fillers in paper handsheets. A batch of bleached chemical softwood pulp was used which was beaten in a Valley beater to give a CSF of 520 cm$^3$. After disintegration and dilution to 2% thick stock, the fibre was further diluted to 0.3 wt % consistency for sheet making. Filler slurry was added together with retention aid (Ciba Percol 292, 0.02 wt % on furnish). Handsheets were made to a basis weight of 80 gm$^{-2}$ using a British handsheet mold.

The retention values of the fillers are listed below in Table 4, and show that the co-processed fillers have superior retention to the control filler.

TABLE 4

| First pass retention values | | |
| --- | --- | --- |
| Ex. 9 control | Ex. 10 co-processed | Ex. 11 co-processed |
| 54% | 66% | 71% |

A sheet making study was performed and the results are given in Table 5 below. Paper properties are interpolated at 30 wt % loading

TABLE 5

| Filler | Tensile Index Nm g$^{-1}$ | Tensile strength % unfilled | Bendtsen porosity cm$^3$ min$^{-1}$ | Bulk cm$^3$ g$^{-1}$ | PPS Roughness 1000 kPa | Brightness F8 | % Opacity F10 |
| --- | --- | --- | --- | --- | --- | --- | --- |
| Unfilled | 64 | 100 | 785 | 1.58 | 10.0 | 85.5 | 72.8 |
| Ex. 9 | 20 | 31.0 | 755 | 1.48 | 8.4 | 82.2 | 91.9 |
| Ex. 10 | 24 | 39.0 | 610 | 1.47 | 8.6 | 82.2 | 91.9 |
| Ex. 11 | 30 | 46.0 | 780 | 1.50 | 9.0 | 82.2 | 91.9 |

Example 13

400 g of unrefined bleached softwood kraft pulp (Botnia Pine RM90) was soaked in 20 litres of water for 6 hours, then slushed in a mechanical mixer. The stock so obtained was then poured into a laboratory Valley beater and refined under load for 28 mins to obtain a sample of refined pulps beaten to 525 cm$^3$ Canadian Standard Freeness (CSF). A second sample was prepared by slushing but not refining at all. The freeness results and refining times are given in Table 6 below:

TABLE 6

| Refining conditions | | |
| --- | --- | --- |
| | Refining time, mins | CSF, cm$^3$ |
| Pulp Sample A | 0 | 705 |
| Sample B | 28 | 525 |

Each of these pulps were then dewatered using a consistency tester (Testing Machines Inc.) to obtain a pad of wet pulp at between 13 and 18 wt % solids. This was then used in co-grinding experiments as detailed below:

630 g of a slurry of ground marble having a particle size (measured by Sedigraph) of 60%<2 μm e.s.d was weighed into a grinding vessel. The dry weight was 233 g. Wet pulp from the dewatering stage described above was added to give 11.6 g (dry weight) of pulp. The pulp was thoroughly mixed with the mineral slurry and then 1485 g Carbolite® 16/20 media and required water added to give a media volume concentration (MVC) of 50% and a slurry solids content of 35 wt %. The samples were ground at 1000 RPM until an energy input of 2500 and 5000 kWh/t (expressed on dry fibre) had been imparted to the samples. The vessel was then removed from the grinder and the media separated using a screen having an aperture size of 600 μm.

Products made from Pulp sample A (unrefined) and B (refined to 525 cm$^3$) were compared using the Filter Paper Burst Increase (FPBI) test (as described below). The results are summarised in Table 7.

TABLE 7

Filter paper burst increase

| Filter | Pulp/energy used during co-grinding | Wt % fibre on product by ash | Fibre d$_{50}$ μm | Fibre steepness (d$_{50}$/d$_{70}$ × 100) | FPBI % |
|---|---|---|---|---|---|
| Control | Water only | — | — | — | 10.3 |
| 1 | Pulp A 2500 kWh/t | 4.3 | 98.6 | 28.7 | 25.2 |
| 2 | Pulp A 5000 kWh/t | 4.9 | 32.9 | 37.7 | 21.4 |
| 3 | Pulp B 2500 kWh/t | 5.0 | 80.0 | 31.7 | 20.0 |
| 4 | Pulp B 5000 kWh/t | 5.0 | 26.5 | 40.2 | 22.9 |

Filter Paper Burst Test

This test was developed to predict the fibre re-inforcing ability of a co-ground slurries containing MFC prepared in accordance with Example 13 above.

15 cm diameter fitter papers (No. 597, Schleicher & Schuell) were used. Sheets were selected by weight to be within 0.02 g of each other. A typical dry weight of a single sheet was 1.4 g.

A suspension of co-ground mineral and pulp was prepared as described in Examples 25-29 above and diluted with water to a solids of 0.25%. A single fitter paper selected above was wetted with water and placed on the wire of a standard consistency testing apparatus (TMI Testing Machines Inc, Ronkonkoma, N.Y.). Aliquots of the suspension from 150 cm$^3$, 200 cm$^3$, 250 cm$^3$ and 300 cm$^3$ were carefully filtered using applied vacuum through the filter paper and the filtrates, if cloudy, re-passed through the mat to ensure good retention of the active components. The fitter paper and its retained solids was then dried at 50% RH and 23° C. supported on steel drying discs and separated by plastic drying rings (Testing Machines Inc.).

The dried papers were tested for burst strength using a Messemer Bachel automatic burst tester. 5 measurements were obtained on each sheet and averaged. The sheets were then dried at 100° C. for 1 hour, placed in a sealed tared container, and weighed to 3 dp. A plot was constructed of sheet weight against burst pressure, from which the burst pressure at a weight of 2.0 g was interpolated (a kPa). The mean burst pressure of the filter paper itself (b kPa) was also measured on 3 selected sheets, conditioned under the same temperature and humidity. The increase in burst pressure was then calculated by the following equation:

Filter paper burst increase(FPBI)=$(a-b)/b \times 100$.

As a control, water only was passed through the filter paper disc. This also had a positive effect on burst, but significantly less than when MFC was present (see Table 7).

The samples produced above were additionally characterised in terms of their particle size using the Malvern Mastersizer (Malvern Instruments, UK). The results are recorded in terms of the mean (d$_{50}$) sizes of the pulp fractions. The particle size steepness of the fibre fraction was also recorded. These data are also listed in Table 7.

Samples made from Pulps A and B were further compared in a handsheet study. The host pulp for these fillers was prepared from the same Botnia RM90 batch beaten to a CSF of 520 cm$^3$, similar to Sample B. Retention aid was Percol 292 (Ciba) added at 0.06 wt % on total furnish solids. Handsheets were prepared at 80 gm$^{-2}$ and tested for burst and tensile strength, bulk, Bendtsen porosity, reflectance at 457 nm (ISO brightness), and opacity. 3 loadings were obtained and results are interpolated to a loading level of 30 wt % (see Table 8). Filler designations refer to Table 7.

The results in Table 8 show that the co-ground fillers give increased strength, reduced porosity and increased opacity without detriment to the brightness, all desirable properties. The increase in strength is sufficient to allow the loading of filler to be increased from 25 wt % using standard GCC filler to 33 wt % with co-ground filler.

TABLE 8

Handsheet results

| Filler | Burst index Nm g$^{-1}$ | Tensile index Nm g$^{-1}$ | Bendsten porosity cm$^3$ min$^{-1}$ | Bulk cm$^3$ g$^{-1}$ | Brightness F8 | % Opacity F10 |
|---|---|---|---|---|---|---|
| Unfilled | 65.4 | 64.9 | 481 | 1.51 | 86.4 | 72.5 |
| Control 60-2 μm GCC | 13.5 | 19.5 | 1500 | 1.525 | 90.8 | 88.2 |
| 1 | 19.5 | 25.5 | 510 | 1.43 | 91.0 | 89.1 |
| 2 | 19 | 25 | 420 | 1.40 | 90.9 | 89.1 |
| 3 | 18.5 | 28.5 | 340 | 1.41 | 91.0 | 89.4 |
| 4 | 17.5 | 25.5 | 390 | 1.41 | 91.0 | 89.9 |

Example 14

400 g of unrefined bleached softwood kraft pulp (Botnia Pine RM90) was soaked in 20 litres of water for 6 hours, then slushed in a mechanical mixer. The stock so obtained was then poured into a laboratory Valley beater and refined under load for 28 mins to obtain a sample of refined pulp beaten to 525 cm$^3$ Canadian Standard Freeness (CSF). The pulp was then dewatered using a consistency tester (Testing Machines Inc.) to obtain a pad of wet pulp at 19.1 wt % solids. This was then used in co-grinding experiments as detailed below: 651 g of a slurry of Carbital 60HS™ (solids 77.9 wt %) was weighed into a grinding pot. 66.5 g of wet pulp was then added and mixed with the carbonate. 1485 g of Carbolite 16/20 grinding media was then added followed by 147 g water to give a media volume concentration of 50%. The mixture was ground together at 1000 rpm until an energy input of 10,000 kWh/t (expressed on fibre) had been expended. The product was separated from the media using a 600 μm BSS screen. The solids content of the resulting slurry was 59.4 wt % and a Brookfield viscosity (100 rpm) of 10,000 mPa·s. The fibre content of the product was analysed by ashing at 450° C. and the size of the mineral and pulp fractions measured using a Malvern Mastersizer.

Example 15

352 g of a slurry of Carbital 60HS™ (solids 77.9 wt %) was weighed into a grinding pot. 71.8 g of wet pulp was then added and mixed with the carbonate. 1485 g of Carbolite 16/20 grinding media was then added followed by 296 g water to give a media volume concentration of 50%. The mixture was ground together at 1000 rpm until an energy input of 10,000 kWh/t (expressed on fibre) had been expended. The product was separated from the media using a 600 μm BSS screen. The solids content of the resulting slurry was 41.9 wt % and a Brookfield 100 rpm viscosity of 5000 mPa·s. The fibre content of the product was analysed by ashing at 450° C. and the size of the mineral and pulp fractions measured using a Malvern Mastersizer.

Example 16

287 g of a slurry of Carbital 60HS™ (solids 77.9 wt %) was weighed into a grinding pot.

87.9 g of wet pulp was then added and mixed with the carbonate. 1485 g of Carbolite 16/20 grinding media was then added followed by 311 g water to give a media volume concentration of 50%. The mixture was ground together at 1000 rpm until an energy input of 10,000 kWh/t (expressed on fibre) had been expended. The product was separated from the media using a 600 μm BSS screen. The solids content of the resulting slurry was 36.0 wt % and a Brookfield 100 rpm viscosity of 7000 mPa·s. The fibre content of the product was analysed by ashing at 450° C. and the size of the mineral and pulp fractions measured using a Malvern Mastersizer.

TABLE 9

Physical properties of pigments

| Filler | Mean GCC size, $d_{50}$, μm | GCC steepness ($d_{30}/d_{70} \times 100$) | Mean fibre size, $d_{50}$, μm | Wt % fibre in product |
|---|---|---|---|---|
| Carbital 60HS | 1.49 | 28.1 | — | 0 |
| Carbital 90HS | 0.86 | 35.6 | — | 0 |
| Carbopaque 90 | 0.78 | 40.6 | — | 0 |
| Ex 14 | 0.95 | 35.0 | 13.6 | 3.3 |
| Ex 15 | 0.69 | 40.2 | 10.1 | 5.6 |
| Ex 16 | 0.68 | 42.5 | 10.9 | 8.1 |

Table 9 shows that, in addition to grinding the fibre to a fine particle size, the fineness and psd steepness of the GCC was also increased to match those of the finer control pigments, Carbital 90™ and Carbopaque 90™.

The references and co-ground pigments described above were made into coating colours and a coating study carried out according to the following examples.

Example 17

Control 129 g of Carbital 60HS (=100 g dry) were weighed into a beaker, mixed using a laboratory stirrer, and 14 g of a 50% suspension of styrene—butadiene—acrylonitrile latex (DL920, Dow Chemical) added to give a binder dose of 7 parts latex per hundred of calcium carbonate (pph). 0.3 dry g of carboxymethyl cellulose (Finnfix 10, CP Kelco) was then added as a 12% solution, followed by 0.5 g of a solution of optical brightening agent (Blankophor P, Kemira). The pH was adjusted to 8.7 using NaOH. A second colour was prepared using an increased latex dose of 9 pph.

Example 18

Control 129.7 g of Carbital 90HS (=100 g dry) were weighed into a beaker, mixed using a laboratory stirrer, and 16 g of a 50% suspension of styrene—butadiene—acrylonitrile latex (DL920, Dow Chemical) added to give a binder dose of 8 parts latex per hundred of calcium carbonate (pph). 0.3 dry g of carboxymethyl cellulose (Finnfix 10, CP Kelco) was then added as a 12% solution, followed by 0.5 g of a solution of optical brightening agent (Blankophor P, Kemira). The pH was adjusted to 8.9 using NaOH. A second colour was prepared using an increased latex dose of 10 pph.

Example 19

Control 139 g of Carbopaque 90 (=100 g dry) were weighed into a beaker, mixed using a laboratory stirrer, and 16 g of a 50% suspension of styrene—butadiene—acrylonitrile latex (DL920, Dow Chemical) added to give a binder dose of 8 parts latex per hundred of calcium carbonate (pph). 0.3 dry g of carboxymethyl cellulose (Finnfix 10, CP Kelco) was then added as a 12% solution, followed by 0.5 g of a solution of optical brightening agent (Blankophor P, Kemira). The pH was adjusted to 8.6 using NaOH. A second colour was prepared using an increased latex dose of 10 pph.

Example 20

Control 129.7 g of Carbital 90HS (=100 g dry) were weighed into a beaker, and 2.5 g of a commercially available powdered cellulose of 1000 nm average particle size (manufacturers value) intended for paper coating (Arbocel MF40, J. Rettenmaier & Söhne, Holzmühle, Germany), was added with mixing using a laboratory stirrer. When the powder had been fully dispersed, 15 g of a 50% suspension of styrene—butadiene—acrylonitrile latex (DL920, Dow Chemical) was added to give a binder dose of 7.5 parts latex per hundred of calcium carbonate (pph). 0.3 dry g of carboxymethyl cellulose (Finnfix 10, CP Kelco) was then added as a 12% solution, followed by 0.5 g of a solution of optical brightening agent (Blankophor P, Kemira). The pH was adjusted to 8.6 using NaOH.

Example 21

173.4 g of the product prepared according to Ex 14 (=103 g dry) were weighed into a beaker, mixed using a laboratory stirrer, and 14 g of a 50% suspension of styrene—butadiene—acrylonitrile latex (DL920, Dow Chemical) added to give a binder dose of 7 parts latex per hundred of dry calcium carbonate (pph). 0.3 dry g of carboxymethyl cellulose (Finnfix 10, CP Kelco) was then added as a 10% solution, followed by 0.5 g of a solution of optical brightening agent (Blankophor P, Kemira). The pH was adjusted to 8.8 using NaOH. A second colour was prepared using an increased latex dose of 9 pph.

Example 22

250.6 g of the product prepared according to Ex 15 (=105 g dry) were weighed into a beaker, mixed using a laboratory stirrer, and 14 g of a 50% suspension of styrene—butadiene—acrylonitrile latex (DL920, Dow Chemical) added to give a binder dose of 7 parts latex per hundred of dry calcium carbonate (pph). 0.3 dry g of carboxymethyl cellulose (Finnfix 10, CP Kelco) was then added as a 10% solution, followed by 0.375 g of a solution of optical brightening agent (Blankophor P, Kemira). The pH was adjusted to 8.6 using NaOH. A second colour was prepared using an increased latex dose of 9 pph.

The colours were coated onto a mechanical basepaper of substance 70 gm$^{-2}$ using a laboratory web coater (Dow coater) with blade metering. The coat weight was adjusted by diluting the colour until the highest coat weight was obtained, subsequently increasing the blade load to reduce the coat weight. Paper samples were produced having coat weight values from about 8 gm$^{-2}$ to 12 gm$^{-2}$. The speed was about 10 m min$^{-1}$.

The coated paper samples were then cut into strips and conditioned for 24 hours at 50% RH and 23° C. before testing for brightness using a Datacolor Elrepho 3300 spectrophotometer. Reflectance measurements were made at 457 nm with and without the UV component in the incident light beam. The difference between the reflectance values with and without UV is recorded as the fluorescence. The smoothness of the coated papers was measured by an air leak method using a Parker Print Surf instrument at a pressure of 1000 kPa. Each of the values was plotted against the coat weight as measured by ash. The results were then interpolated to a common coat weight of 10 gm$^{-2}$ and tabulated in Table 11.

TABLE 10

Coating colour properties

| | Latex level pph | Solids wt % | Brookfield 100 rpm viscosity, mPa · s |
|---|---|---|---|
| Ex 17 | 7 | 50.0 | 52 |
| | 9 | 49.2 | 52 |
| Ex 18 | 8 | 50.0 | 62 |
| | 10 | 42.7 | 86 |
| Ex 19 | 8 | 50.1 | 67 |
| | 10 | 49.9 | 69 |
| Ex 20 | 7.5 | 45.8 | 67 |
| Ex 21 | 7 | 45.0 | 1008 |
| | 9 | 44.9 | 928 |
| Ex 22 | 7 | 38.2 | 1444 |
| | 9 | 38.3 | 1280 |

TABLE 11

Paper properties at 10 gm$^{-2}$

| | Latex level pph | Brightness + UV % | Fluorescence % | PPS Smoothness 1000 kPa μm |
|---|---|---|---|---|
| Ex 17 | 7 | 79.3 | 2.2 | 7.5 |
| | 9 | 79.5 | 2.3 | 7.6 |
| Ex 18 | 8 | 79.5 | 2.4 | 7.8 |
| | 10 | 79.2 | 2.4 | 7.7 |
| Ex 19 | 8 | 80.6 | 2.3 | 7.2 |
| | 10 | 80.5 | 2.2 | 7.2 |
| Ex 20 | 7.5 | 80.4 | 3.1 | 7.6 |
| Ex 21 | 7 | 83.0 | 4.9 | 6.7 |
| | 9 | 82.4 | 5.0 | 6.8 |
| Ex 22 | 7 | 83.9 | 5.2 | 6.9 |
| | 9 | 83.7 | 5.2 | 6.9 |

The results in Table 11 show that the invention gives increased brightness, fluorescence and increased smoothness.

Example 23

630 g of a slurry of ground marble having a particle size (measured by Sedigraph) of 60%<2 μm esd was weighed into a grinding vessel. The dry weight was 233 g. 54 g of wet Eucalyptus pulp beaten to a CSF of 525 cm$^3$ (see Table 12) were added, equivalent to 11.6 g dry weight. The pulp was thoroughly mixed with the mineral slurry and then 1485 g Carbolite 16/20 media and 16 cm$^3$ water added. This equates to a media volume concentration (MVC) of 50% and a slurry solids content of 35 wt %. The samples were ground at 1000 RPM until an energy input of 2500 and 5000 kWh/t (expressed on dry fibre) had been imparted to the samples. The temperature reached 55° C. The vessel was then removed from the grinder and the media separated using a screen having an aperture size of 600 μm.

Example 24

The procedure described in Example 23 was repeated, this time using a bleached kraft softwood pulp (Botnia Pine RM90) beaten to 520 cm$^3$ CSF.

Example 25

The procedure described in Example 23 was repeated, this time using a sample of disintegrated thermomechanical pulp having a CSF of 700 cm$^3$.

Example 26

The procedure described in Example 23 was repeated, this time using a sample of Acacia pulp beaten to a CSF of 520 cm$^3$.

Example 27

The procedure described in Example 23 was repeated, this time using a sample of hardwood (birch) pulp beaten to a CSF of 520 cm$^3$.

The fibre re-inforcing ability of co-ground slurries containing MFC prepared in accordance with Examples 23-27 above was determined using the filter paper burst test described above. Results are given in table 12 below.

The samples produced above were additionally characterised in terms of their particle size using the Malvern Mastersizer (Malvern Instruments, UK). The results are recorded in terms of the mean ($d_{50}$) sizes of the GCC and pulp fractions. The particle size steepness of the fibre fraction was also recorded. These data are also listed in Table 12.

These results show that all the pulp types produce strength increases when subjected to co-grinding with GCC.

TABLE 12

Evaluation of the products using the filter paper test

| Example | Pulp | Wt % fibre on mineral by ash | GCC $d_{50}$ μm | Fibre $d_{50}$ μm | Fibre steepness ($d_{30}/d_{70}$ × 100) | FPBI % |
|---|---|---|---|---|---|---|
| Control | Water only | — | — | — | — | 10.3 |
| 23a | Eucalyptus 2500 kWh/t | 4.6 | 1.55 | 54.0 | 37.8 | 23.0 |
| 23b | Eucalyptus 5000 kWh/t | 4.7 | 1.3 | 21.5 | 40.0 | 22.2 |
| 24a | TMP 2500 kWh/t | 5.4 | 1.55 | 44.0 | 32.8 | 17.0 |
| 24b | TMP 5000 kWh/t | 6.0 | 1.4 | 18.5 | 38.1 | 26.4 |
| 25a | Pine 2500 kWh/t | 5.0 | 1.6 | 75.0 | 33.2 | 20.0 |

TABLE 12-continued

Evaluation of the products using the filter paper test

| Example | Pulp | Wt % fibre on mineral by ash | GCC $d_{50}$ μm | Fibre $d_{50}$ μm | Fibre steepness $(d_{30}/d_{70} \times 100)$ | FPBI % |
|---|---|---|---|---|---|---|
| 25b | Pine 5000 kWh/t | 5.3 | 1.4 | 29.0 | 37.3 | 21.3 |
| 26a | Acacia 2500 kWh/t | 5.3 | 1.5 | 54.5 | 39.3 | 16.0 |
| 26b | Acacia 5000 kWh/t | 6.3 | 1.3 | 23.0 | 40.1 | 21.8 |
| 27a | Birch 2500 kWh/t | 5.0 | 1.55 | 56.5 | 36.0 | 21.0 |
| 27b | Birch 5000 kWh/t | 4.6 | 1.15 | 17.0 | 37.8 | 25.5 |

Example 28

400 g of unrefined bleached softwood kraft pulp (Botnia Pine RM90) was soaked in 20 litres of water for 6 hours, then slushed in a mechanical mixer. The stock so obtained was then poured into a laboratory Valley beater and refined under load for 28 mins to obtain a sample of refined pulp beaten to 525 cm$^3$ Canadian Standard Freeness (CSF).

The pulp was then dewatered using a consistency tester (Testing Machines Inc.) to obtain a pad of wet pulp at 19.1 wt % solids. This was then used in grinding experiments as detailed below:

Example 29

584 g of a slurry of ground marble having a particle size (measured by Sedigraph) of 60%<2 μm esd was weighed into a grinding vessel. The dry weight was 231 g. Wet pulp from the dewatering stage described above (Example 28) was added to give 11.6 g (dry weight) of pulp. The pulp was thoroughly mixed with the mineral slurry and then 1485 g Carbolite 16/20 media and required water added to give a media volume concentration (MVC) of 50% and a slurry solids content of 35 wt %. The sample was ground at 1000 RPM until an energy input of 2500 kWh/t and 5000 kWh/t (expressed on dry fibre) had been imparted to the samples. The vessel was then removed from the grinder and the media separated using a screen having an aperture size of 600 μm. The fibre content of the product was analysed by ashing at 450° C. and the size of the mineral and pulp fractions measured using a Malvern Mastersizer (see Table 13).

Example 30

176 g of a slurry of ground marble having a particle size (measured by Sedigraph) of 60%<2 μm esd was weighed into a grinding vessel. The dry weight was 65 g. Wet pulp from the dewatering stage described above was added to give 8.5 g (dry weight) of pulp. The pulp was thoroughly mixed with the mineral slurry and then 1485 g Carbolite 16/20 media and required water added to give a media volume concentration (MVC) of 50% and a slurry solids content of 12.5 wt %. The samples were ground at 1000 RPM until an energy input of 3750 and 5000 kWh/t (expressed on dry fibre) had been imparted to the samples. The vessel was then removed from the grinder and the media separated using a screen having an aperture size of 600 μm. The fibre content of the product was analysed by ashing at 450° C. and the size of the mineral and pulp fractions measured using a Malvem Mastersizer (see Table 13).

TABLE 13

| Filler | GCC modal particle size, μm | Fibre $d_{50}$, μm | Wt % fibre in product |
|---|---|---|---|
| Control 60-2 μm GCC | 2.72 | — | 0 |
| Ex 29 2500 kW | 2.1 | 66.5 | 4.5 |
| Ex 29 5000 kW | 1.73 | 26 | 4.7 |
| Ex 30 3750 kW | 1.61 | 65 | 11.7 |
| Ex 30 5000 kW | 1.41 | 42 | 11.7 |

Example 31

Handsheet Evaluation

Samples made in Examples 29 and 30 were compared in a handsheet study. The control filler was the same 60%<2 μm ground marble used in the grinding experiments. The host pulp for these fillers was prepared from the same Botnia RM90 batch beaten to a CSF of 520 cm$^3$. Retention aid was Percol 292 (Ciba) added at 0.06 wt % on total furnish solids. Handsheets were prepared at 80 gm$^{-2}$ and tested for burst and tensile strength, bulk, Bendtsen porosity, reflectance at 457 nm (ISO brightness), and opacity. Three loadings were obtained and results (Table 14) interpolated to a loading level of 30 wt %.

TABLE 14

Handsheet results

| Filler | Burst index Nm g$^{-1}$ | Tensile index Nm g$^{-1}$ | Bendsten porosity cm$^3$ min$^{-1}$ | Bulk cm$^3$ g$^{-1}$ | Brightness F8 | % Opacity F10 |
|---|---|---|---|---|---|---|
| Unfilled | 57.6 | 59.8 | 757 | 1.57 | 86.8 | 74.1 |
| Control 60-2 μm GCC | 13.0 | 18.5 | 1800 | 1.53 | 91.6 | 88.0 |
| Ex 29 2500 kW | 18.0 | 23.5 | 500 | 1.45 | 91.5 | 89.1 |
| Ex 29 5000 kW | 17.0 | 21.5 | 650 | 1.42 | 91.4 | 89.1 |
| Ex 30 3750 kW | 24.0 | 27.5 | 130 | 1.40 | 91.4 | 90.2 |
| Ex 30 5000 kW | 25.0 | 27.5 | 130 | 1.38 | 91.3 | 90.2 |

The above results show that the co-ground fillers give increased strength, reduced porosity and increased opacity without detriment to the brightness, all desirable properties. Using fillers from Example 30 containing 11.7% co-ground fibre, the increase in strength is sufficient to allow the loading of filler to be increased from 25 wt % using standard GCC filler to 40 wt % without loss of burst strength.

Example 32

321 g of a 72 wt % slurry of filler kaolin (WP, Imerys) was weighed into a grinding pot. 105.9 g of wet unbleached North American kraft pine pulp at 10.9 wt % solids was then mixed in together with an additional 266 cm$^3$ water. 1485 g Carbolite 16/20 media was added and the mixture ground at 1000 rpm using a work input of 250 kWh/t expressed on dry mineral+pulp. The fibre content of the dry product after separation on a 700 pm screen was 3.9 wt % on the mineral measured by ignition at 950° C. The mean particle size ($d_{50}$) of the fibre was estimated at 83 μm using a Malvern Mastersizer.

Example 33

206 g of a 72 wt % slurry of filler kaolin (WP, Imerys) was weighed into a grinding pot. 108.7 g of wet unbleached North American kraft pine pulp at 10.9 wt % solids was then mixed in together with an additional 326 cm$^3$ water. 1485 g Carbolite 16/20 media was added and the mixture ground at 1000 rpm using a work input of 400 kWh/t expressed on mineral+pulp. The fibre content of the dry product after separation on a 700 μm screen was 6.2 wt %. The mean particle size ($d_{50}$) of the fibre was estimated at 95 μm using a Malvern Mastersizer.

The host pulp for this study was the same batch of unbleached North American kraft pine pulp used in Examples 32 and 33. This was used as received from the manufacturer, diluting with water as required. Retention aid was Percol 292 (Ciba) added at 0.14 wt % on total furnish solids.

Handsheets were made at a target weight of 160 gm$^{-2}$ with a target filler loading of 5 wt %. The sheets were pressed twice, and dried using a heated drum dryer, and conditioned for 12 hours at 50% RH and 23 C. A sample of the WP kaolin slurry was used as the control.

The sheets were tested for tensile strength, and clay content by ash. The results are set forth in Table 15 below:

TABLE 15

Linerboard results

| Filler | Loading wt % | Tensile index (Nm g$^{-1}$) |
|---|---|---|
| Unfilled | 0 | 33.0 |
| WP control | 4.4 | 23.1 |
| Ex 32 | 3.9 | 31.1 |
| Ex 33 | 3.7 | 29.4 |

The above results show that the co-ground kaolin filler has considerably less weakening effect than unmodified kaolin in linerboard furnishes based on unbleached kraft pulp.

Example 34

400 g of unrefined bleached softwood kraft pulp was soaked in 20 litres of water for 6 hours, then slushed in a mechanical mixer. The stock so obtained was then poured into a laboratory Valley beater and refined under load for 28 mins to obtain a sample of refined pulps beaten to 525 cm$^3$ Canadian Standard Freeness (CSF).

The pulp were then dewatered using a consistency tester (Testing Machines Inc.) to obtain a pad of wet pulp at between 13 and 18 wt % solids. This was then used in co-grinding experiments as detailed below:

Example 35

750 g of dry English kaolin (Intramax 60) was made into a slurry by mixing with 540 cm$^3$ water and 1.9 g of a 40% solution of polyacrylate dispersant (Accumer 9300, Rohm & Haas). The pH was adjusted to 7 using NaOH, and the final solids was 57.2 wt %. The slurry was then transferred to a grinding pot and 37.5 dry g of the wet pulp prepared above (Example 34) mixed with it. The pH was adjusted to 9 with NaOH and 1500 g of Carbolite 16/20 grinding media added. The mix was ground together for 60 minutes with addition of water as required to maintain fluidity. After 60 minutes the temperature reached 55° C. The ground product was then separated from the media using screen of 700 μm aperture. The energy input was measured at 147 kWh/t, final solids was 45.8 wt %, pH 9.2, and the dry product had a fibre content of 4.95 wt % expressed on total product. The modal particle size of the fibre component was measured using a Malvern Mastersizer at 44 μm (esd).

Example 36

750 dry g of Intramax 60 was weighed into a grinding pot as a 57 wt % slurry as prepared above (Example 34). 37.5 dry g of the wet pulw was added and the pH was then adjusted to 4.0 using 10% orthophosphoric acid. 1500 g Carbolite 16/20 media was then added and the mix ground for 60 mins, after which time the temperature had reached 54° C. The work input was 140 kWh/t. The slurry was separated as before and the final solids was 42 wt %. The pH was 5.3. The fibre content of the product was measured at 4.0 wt %. Surprisingly, the modal particle size of the fibre component was measured using a Malvern Mastersizer at 0.50 μm (esd), almost an order of magnitude finer than at pH 9. This unexpected observation suggests that grinding under acid conditions is much more effective than under alkaline conditions.

Example 37

750 g dry marble flour was placed into a grinding pot with 400 cm$^3$ water and ground for 57 minutes with a work input of 120 kWh/t. The product was shown to have 58 wt % of particles<2 μm esd, by Sedigraph. 37.5 dry g of wet pulp (as prepared in Example 34) was then mixed and the grind continued for a further 2 hours with the addition of 800 cm$^3$ further water and the expenditure of a further 313 kWh/t. The final temperature was 74° C., solids 37.4 wt %, and the fibre content of the dry product after separation on a 700 μm screen was 4.4 wt %. The modal particle size of the fibre was estimated at 50 μm using a Malvern Mastersizer.

Example 38

750 dry g of Optical HB (scalenohedral PCC) as a 34% solids slurry was mixed with 37 g dry wt of wet pulp (as prepared in Example 34) and 200 cm$^3$ of water and 1500 g Carbolite 16/20 media added. The mixture was ground for 1 hour, using 154 kWh/t. The final temperature was 53° C. and after separation of the media the slurry had a solids content of 41 wt % and the dried product had a fibre content of 5.3 wt %. The modal particle size of the fibre component was between 100 and 200 μm by Malvern Mastersizer.

Example 39

Newsprint Study

These fillers were further compared in a handsheet study. The host pulp for these fillers was prepared by slushing a Northern European thermo-mechanical pulp sample. Since the pulp as received had a CSF of 50 cm$^3$, no further refining was done. Retention aid was Percol 292 (Ciba) added at 0.02 wt % on total furnish solids. Handsheets were prepared at 50 gm$^{-2}$ and tested for burst and tensile strength, bulk, Bendtsen porosity, reflectance at 457 nm (ISO brightness), and opacity. Three loadings were obtained and the results (see Table 16) are interpolated to a loading level of 10 wt %.

These results show that the co-ground fillers, especially with Intramax, give increased strength, and reduced porosity, all desirable properties, compared to the control fillers. Brightness and opacity are only slightly reduced. With Intramax, the increase in strength is sufficient to allow the loading of filler to be increased from 0 wt % to at least 8 wt % with co-ground filler without loss of strength. The filled paper would have lower porosity, and increased brightness and opacity.

TABLE 16

Handsheet results: newsprint, 10 wt % filler loading

| Filler | Burst index Nm g$^{-1}$ | Tensile index Nm g$^{-1}$ | Bendsten porosity cm$^3$ min$^{-1}$ | Bulk cm$^3$ g$^{-1}$ | Brightness F8 | % Opacity F10 |
|---|---|---|---|---|---|---|
| Unfilled | 26.4 | 41.6 | 63 | 1.95 | 71.1 | 81.6 |
| Control Intramax | 20.5 | 38.0 | 60 | 1.87 | 72.7 | 85.7 |
| Ex 35 | 24.0 | 41.0 | 46 | 1.84 | 71.8 | 85.2 |
| Ex 36 | 24.5 | 40.0 | 46 | 1.85 | 71.5 | 85.4 |
| Control GCC | 19.0 | 32.0 | 98 | 1.95 | 75.3 | 86.8 |
| Ex 37 | 20.0 | 35.5 | 88 | 1.93 | 74.8 | 86.5 |
| Control OC HB | 19.9 | 33.3 | 153 | 2.00 | 75.7 | 87.6 |
| Ex 38 | 21.0 | 35.5 | 90 | 1.93 | 75.8 | 88.0 |

Example 40

Supercalendered Magazine Paper Study

A handsheet study was carried using the same pulp as in the newsprint study. The time sheets were made at 55 gm$^{-2}$, with filler loadings covering the range from 30 to 40 wt %. Due to the higher loadings, the retention aid dose was increased to 0.07 wt % Percol 292. Handsheets were tested for burst and tensile strength, bulk, Bendtsen porosity, reflectance at 457 nm (ISO brightness), and opacity. Three loadings were obtained and the results (see Table 17) are interpolated to a loading level of 32 wt %.

TABLE 17

Handsheet results: SC magazine, 32 wt % filler loading

| Filler | Burst index Nm g$^{-1}$ | Tensile index Nm g$^{-1}$ | Bendsten porosity cm$^3$ min$^{-1}$ | Bulk cm$^3$ g$^{-1}$ | Brightness F8 | % Opacity F10 |
|---|---|---|---|---|---|---|
| Unfilled | 25.6 | 45.2 | 59 | 1.95 | 70.4 | 82.3 |
| Control Intramax | 11.0 | 18.4 | 71 | 1.66 | 76.2 | 91.4 |
| Ex 35 | 13.4 | 22.0 | 58 | 1.63 | 76.1 | 91.4 |
| Ex 36 | 12.2 | 22.5 | 57 | 1.61 | 75.9 | 91.4 |
| Control GCC | 11.1 | 17.2 | 210 | 1.74 | 79.8 | 89.9 |
| Ex 37 | 12.0 | 19.7 | 150 | 1.73 | 79.8 | 90.0 |

These results show that increased strength, reduced porosity, and similar brightness and opacity are obtained using co-ground fillers. In the case of Intramax, the loading could be increased from 30 wt % to at least 36 wt % without loss of strength, with reduced porosity and increased brightness and opacity.

Example 41

Handsheet Study

The host pulp for this study was a batch of bleached chemical kraft softwood pulp which was slushed at 2% consistency and beaten in a Valley beater to a CSF of 520 cm$^3$. Retention aid was Percol 292 (Ciba) added at 0.02 wt % on total furnish solids.

Two sets of sheets were made using scalenohedral precipitated calcium carbonate (Optical HB, Imerys) at 25 (Set A) and 32 wt % (Set B) loading levels. A further set of sheets (Set C) were made at a loading of 25 wt % Optical HB+7 wt % of co-ground GCC from Example 37, so that the total loading was 32 wt %. A control set (Set D) was made at a loading 25 wt % Optical HB+7 wt % of a standard GCC of 60%<2 μm. A final set (Set E) was made using a 50/50 blend of Optical HB and co-ground GCC from Example 37 so that the total loading was 31 wt %.

Handsheets were prepared at 80 gm$^{-2}$, pressed twice, and dried using a heated drum dryer, and conditioned for 12 hours at 50% RH and 23° C. The sheets were tested for tensile strength, bulk, Bendtsen porosity, reflectance at 457 nm (ISO brightness), and opacity. The results are set forth in the Table 16 below:

These results show that the co-ground GCC filler can be used to increase further the filler loading of PCC-filled sheets with lower loss in strength than if only PCC was used. At the higher loadings, optical properties are maintained and porosity is reduced without serious loss of bulk.

TABLE 16

PCC top up results

| Filler | Tensile index Nm g$^{-1}$ | Bendtsen porosity cm$^3$ min$^{-1}$ | Bulk cm$^3$ g$^{-1}$ | Brightness F8 | % Opacity F10 (80 gm$^{-2}$) |
|---|---|---|---|---|---|
| Unfilled | 66.6 | 213 | 1.50 | 84.0 | 73.8 |
| Set A 25.3% Optical HB | 29.4 | 1131 | 1.63 | 90.0 | 89.4 |
| Set B 31.7% Optical HB | 21.6 | 1420 | 1.62 | 90.8 | 90.7 |
| Set C 32.5% OHB + Ex 37 | 25.0 | 992 | 1.57 | 90.8 | 90.8 |
| Set D 31.6% OHB + Control GCC | 24.0 | 1123 | 1.58 | 90.8 | 90.6 |
| Set E 30.9% 50/50 OCB/Ex 37 | 26.2 | 824 | 1.53 | 90.5 | 90.2 |

Example 41

Samples were prepared using a laboratory vertical stirred media mill equipped with a cylindrical, un-baffled grinding vessel of internal diameter—14.5 cm. The mill was equipped with a vertical impeller having a circular cross section shaft of 1.8 cm diameter. The shaft was equipped with 4 impeller arms arranged in an X configuration at the bottom of the shaft. The impeller arms were of circular cross section and 1.8 cm diameter and were 6.5 cm long from shaft axis centreline to tip.

Grinding media (Carbolite, Carbo Ceramics Inc, USA) was of 16/20 mesh size and had specific gravity 2.7.

Ground Calcium Carbonate (GCC) (Intracarb 60, IMERYS Minerals, Belgium) had a sedigraph particle size of 60%<2 μm.

Pulp was bleached kraft softwood (Botnia Pine RM90) beaten to 520 cm$^3$ CSF.

Lab grinds were based on 1.5 kg of grinding media, 50% Media Volume Concentration (MVC), Pulp level of 5 wt. % of total solids, energy input 2500 kWh/t of pulp and impeller speed 1000 rpm. Grinds were performed in batch mode at a range of solids levels.

At the end of each grind the grinding chamber was removed from the mill and the contents removed. The grinding media was then separated from the product external to the mill.

The conditions for each grind and the resultant product properties are shown below in Table 17. The B100 viscosity is the viscosity measured on a Brookfield viscometer (Brookfield Viscometers Ltd, Brookfield Technical Centre, Stadium Way, Harlow, Essex CM19 5GX, England) at 100 rpm.

TABLE 17

| Sample | Grinding solids (wt. %) | B100 viscosity (mPas) | Pulp content (wt. %) | Fibre $d_{50}$ (μm) | Modal fibre particle size (μm) | Fibre steepness | Filter paper burst increase test (% increase in burst) |
|---|---|---|---|---|---|---|---|
| 1 | 35 | 9600 | 4.6 | 87 | 89 | 30 | 20 |
| 2 | 27.5 | 4500 | 4.6 | | 96 | 28 | 17 |
| 3 | 22.5 | 1850 | 4.3 | 138 | 259 | 28 | 17 |
| 4 | 17.5 | 950 | 4.1 | 205 | 352 | 31 | 12 |
| 5 | 12.5 | 330 | 3.6 | 203 | 409 | 30 | 15 |

These data indicate:
The sample produced at the highest grinding solids has:
  the highest viscosity, the highest pulp content, the finest MFC size and the highest (best) filter paper burst increase test.
Samples produced at lower grinding solids have lower viscosity, lower pulp content, coarser MFC size and lower filter paper burst increase tests.
All of the samples have high viscosity compared to typical GCC products where B100 viscosities of <200 mPas are typical Example 42

An attempt was made to produce a co-ground product in a full scale SMD equipped with a standard 250 um screen (www.metso.com). The grinding media, GCC and pulp were the same as in Example 41 except that the pulp was unrefined. The grinding media charge was 5 tonnes. The operating conditions were also similar to those used in Example 41; 50% MVC, pulp level of 5 wt. % of total solids, energy input 2500 kWh/t of pulp and a variety of impeller rpm to give a similar tip speed to that of the lab mill. The grinds were performed in continuous open circuit mode.

Initially, grinding was attempted at 35 wt. % total solids as in Example 41. However, it was not possible to produce any product under these conditions. The high viscosity product would not flow through the screen and out of the mill. Instead the material built up in the mill. The grinding solids were lowered to less than 20 wt. % to obtain an acceptable flow through the mill and the products under these conditions did not show the same improvements in performance in paper as seen with the higher solids grinding.

For example, Sample 1 in Example 41 was produced in a lab batch grind (50% MVC, pulp level of 5% of total solids, energy input 2500 kWh/t of pulp and 1000 rpm impeller speed) at 35% solids. Samples 6 and 7 were produced in a full scale SMD equipped with a standard 250 um screen under similar conditions except that the solids were lowered to <20% in order to achieve a flow through the mill.

TABLE

| Sample ID | Modal fibre particle size (um) | Filler loading for Burst Index of 20 Nm/g |
|---|---|---|
| 1 | 89 | 28 |
| 6 | 194 | 24 |
| 7 | 264 | 23.5 |
| Intracarb 60 | — | 20 |

These data show
Both the lab and full scale produced MFC allowed increased filler loadings compared to the control.
However, the MFC produced in the lab batch grind at 35% solids had finer fibre peak max and allowed a higher filler loading than the sample produced in an SMD where the solids had to be lowered to allow a flow through the mill
NB It was not possible to operate the SMD under the high solids condition.

Example 43

Samples were prepared using a pilot scale vertical stirred media mill equipped with a cylindrical, grinding vessel of internal diameter—87 cm. The mill was equipped with a vertical impeller having a circular cross section shaft. The shaft was equipped with 4 impeller arms arranged in an X configuration at the bottom of the shaft. The impeller arms were of circular cross section and were 30 cm long from shaft axis centreline to tip.

The grinder was operated in batch mode. GCC and pulp were the same as in Example 41. Tests were performed at 50% MVC, and 39% solids with a pulp level of 5% of the total solids. The grinder rpm was 285. The pulp was unbeaten. Two sets of tests were performed. The first utilised 16/20 grinding media as in Example 41 and the second 3 mm media with the same density. The fibre $d_{50}$ and modal mineral particle size for both tests are shown in Table X.

TABLE

| Energy input (kWh/t) | Fibre $d_{50}$ (μm) | | Modal mineral particle size (μm) | |
|---|---|---|---|---|
| | 16/20 | 3 mm | 16/20 | 3 mm |
| 3750 | 73 | 61 | 1.61 | 1.94 |
| 5000 | 42 | 44 | 1.42 | 1.83 |
| 7500 | 15 | 27 | 1.01 | 1.61 |
| 10000 | 8 | 16 | 0.80 | 1.37 |

These data show that fibre grinding behaviour was similar with coarser media especially at the lower energy inputs. However, mineral grinding was significantly reduced by use of the coarser media.

Example 44

These tests were performed in the same pilot grinder as was used in Example 43. GCC and pulp were the same as in Examples 41 and 42

A sample was prepared in batch mode under the following conditions and with unbeaten pulp. Total solids 10%, pulp as percentage of total solids 20%; MVC 50%; 285 rpm; 3 mm media; Energy input 3500 kWh/t pulp. The resultant sample (sample 8) had a fibre $d_{50}$ of 102 μm In another test the same conditions were used but in this case the grinder was configured in recirculating batch mode with a 250 um screen. The flow rates were unacceptable because of the high viscosity of the product and no product was obtained.

In a further test a sample was prepared with the grinder configured in recirculating batch mode and a 1 mm screen was used and a high flow rate of 60 l/min was obtained. The resultant sample (sample 9) had a fibre $d_{50}$ of 107 μm.

The two samples were used in a handsheet evaluation using the same procedure as in Example 42. Results are summarized in Table X.

TABLE X

| Sample ID | Configuration | Fibre $d_{50}$ (μm) | Filler loading for 30% of unfilled burst |
|---|---|---|---|
| 8 | Batch | 102 | 54 |
| 9 | Recirculating batch | 107 | 50 |
| Intracarb 60 | — | — | 26 |

These data show that the use of coarse media and hence coarse screens allows the preparation of a co-ground product in a commercially viable, re-circulating batch (or continuous) configuration, despite the high viscosity of the product.

Example 45

Tests were performed in a pilot scale tower mill (Hosokawa Alpine model ANR 250). This is a vertical stirred media mill with an un-baffled cylindrical grinding chamber and a vertical impeller shaft equipped with a series of impeller rotor disks throughout its length. The mill is approximately two thirds filled with grinding media. In operation feed enters the mill at the bottom and passes through the grinding zone before rising to a quiescent zone where the grinding media starts to sediment away from the product. The product then exits the mill via a classifier wheel which serves to retain any further grinding media within the mill.

A co-ground product was prepared in an open circuit continuous configuration under the following conditions and with unbeaten pulp. Total solids 12.4 wt. %; pulp as percentage of total solids 20%; average MVC 22%; 500 rpm; 2-2.5 mm media of specific gravity about 6; Energy input 3200 kWh/t pulp. Flow rate into the mill 1.7 l/min Initial attempts to run under these conditions were unsuccessful since the grinding media was carried over into the product. (An earlier attempt using 1 mm media failed as well also because of media carry over).

Subsequently a water addition of approx 1 l/min was made immediately before the classifier wheel reducing the solids of the product exiting the mill to 8.1 wt. %. Under these conditions all the media was retained in the mill.

The resultant sample (sample 10) had a fibre $d_{50}$ of 145 μm and a modal fibre particle size of 89 μm and was evaluated in a handsheet evaluation using the same procedure as in Example 42. Results are summarized in Table X.

TABLE X

| Sample ID | Configuration | Fibre $d_{50}$ (μm) | Modal Fibre particle size (μm) | Filler loading for 30% of unfilled burst |
|---|---|---|---|---|
| 10 | Tower mill with coarse dense media and water addition before classifier | 145 | 89 | 49 |
| Intracarb 60 | — | — | — | 25 |

These data show that the use of coarse dense media and water addition immediately before the classifier wheel in a tower mill allows the preparation of co-ground in a, commercially viable configuration despite the high viscosity of the product.

Example 46

Samples are prepared using a laboratory vertical stirred media mill equipped with a cylindrical, un-baffled grinding vessel of internal diameter—14.5 cm. The mill is equipped with a vertical impeller having a circular cross section shaft of 1.8 cm diameter. The shaft is equipped with 4 impeller arms arranged in an X configuration at the bottom of the shaft. The impeller arms are of circular cross section and 1.8 cm diameter and are 6.5 cm long from shaft axis centreline to tip.

Grinding media (Carbolite, Carbo Ceramics Inc, USA) is 16/20 mesh size having a specific gravity of 2.7.

Pulp is bleached kraft softwood (Botnia Pine RM90) beaten to 520 $cm^3$ CSF.

Lab grinds are based on 1.5 kg of grinding media, 50% Media Volume Concentration (MVC) which may be varied, pulp levels cover the consistency range up to 10 wt. %, Energy inputs of up to 20 000 kWh/t of pulp are investigated using an impeller speed of 1000 rpm. Grinds are performed in batch mode at a range of solids levels.

At the end of each grind the grinding chamber would be removed from the mill and the contents removed. The grinding media is separated from the product external to the mill.

The MFC products are characterised for particle size using a Malvern light scattering device, for B100 viscosity using a Brookfield viscometer (Brookfield Viscometers Ltd, Brookfield Technical Centre, Stadium Way, Harlow, Essex CM19 5GX, England) at 100 rpm and the paper performance evaluated using the filter paper burst increase test and the handsheet method of Example 7 except that no filler is used or else the filler is Intracarb 60 (Imerys, Belgium).

The expectation is that the MFC produced gives increased filter paper burst tests and stronger hand sheets. It is envisaged that higher consistency and higher energy processing favour finer MFC and that there may be an optimum MFC size for paper strength performance. The optimum performance will, likely, be obtained most efficiently by processing at high consistency.

Example 47

Samples are prepared using a pilot scale vertical stirred media mill equipped with a cylindrical, grinding vessel of internal diameter 87 cm. The mill is equipped with a vertical impeller having a circular cross section shaft. The shaft is equipped with 4 impeller arms arranged in an X configuration at the bottom of the shaft. The impeller arms are of circular cross section and are 30 cm long from shaft axis centreline to tip.

The grinder is operated in batch mode. Pulp is the same as in Example 46. Tests are performed under optimised conditions from Example 46. Grinder rpm is about 285.

The pulp is unbeaten. Two sets of tests are performed. The first utilising 16/20 grinding media as in Example 46 and the second 3 mm media with the same density The MFC produced is characterised and evaluated using the method of Example 46.

It is envisaged that both grinding media would give similar psd MFC and that these MFC samples will allow production of handsheets with increased strength Example 48

Tests are performed in the same pilot grinder as was used in Example 42.

Pulp is the same as in Example 45. The grinding media is 3 mm.

A MFC sample is prepared in batch mode under the optimised conditions from Example 45. The MFC psd properties of the resultant sample will be determined.

In another test the same conditions would be used but in this case the grinder would be configured in recirculating batch mode with a 250 um screen. The flow rates would probably be unacceptable because of the high viscosity of the product and no product would be obtained.

In a further test a sample is prepared with the grinder configured in recirculating batch mode and a 1 mm screen is used and a high flow rate is expected.

The MFC produced is characterised and evaluated using the method of Example 45.

It is expected that the data will show that the use of coarse media and hence coarse screens allows the preparation of fine psd MFC at high consistency and low energy in a, commercially viable, re-circulating batch (or continuous), configuration despite the high viscosity of the product.

Example 49

Tests are performed in a pilot scale tower mill (Hosokawa Alpine model ANR 250). This is a vertical stirred media mill with an un-baffled cylindrical grinding chamber and a vertical impeller shaft equipped with a series of impeller rotor disks throughout its length. The mill is approximately two thirds filled with grinding media. In operation, feed enters the mill at the bottom and passes through the grinding zone before rising to a quiescent zone where the grinding media starts to sediment away from the product. The product then exits the mill via a classifier wheel which serves to retain any further grinding media within the mill.

A MFC sample is prepared in an open circuit continuous configuration under the optimised conditions from Example 46 and with unbeaten pulp. 2-2.5 mm grinding media of specific gravity about 6 is used. Energy inputs in the range 2000-15000 kWh/t pulp would are used.

It is expected that initial attempts to run under these conditions would be unsuccessful due to the the grinding media being carried over into the product because of the high viscosity of the MFC.

Subsequently a water addition is made immediately before the classifier wheel reducing the solids of the product exiting the mill to a level where the media is not carried over. Under these conditions all the media is retained in the mill The MFC produced is characterised and evaluated using the method of Example 46.

The resultant sample will have a fine fibre psd. Evaluations in hand sheets will indicate that the MFC produced gave increases in burst strength of the sheets These data indicate that the use of coarse dense media and water addition immediately before the classifier wheel in a tower mill allows the preparation of MFC in a, commercially viable configuration despite the high viscosity of the product.

The invention claimed is:

1. An aqueous composition comprising microfibrillated cellulose obtainable by a method comprising the steps of:
providing a fibrous substrate comprising cellulose, wherein the fibrous substrate comprises cellulose having a Canadian Standard freeness equal to or less than 450 cm$^3$;
microfibrillating the fibrous substrate in an aqueous environment by grinding in the presence of a grinding medium consisting essentially of mullite, and
wherein the grinding is carried out in the absence of grindable inorganic particulate matter,
wherein the grinding medium is present in an amount of at least about 10% by volume of the aqueous environment, and
wherein the microfibrillated cellulose has a fibre steepness of from about 20 to about 50.

2. The aqueous composition of claim 1, wherein the grinding is performed in a stirred media detritor.

3. The aqueous composition of claim 2, wherein the stirred media detritor comprises one or more screens having a nominal aperture size of at least about 250 µm.

4. The aqueous composition of claim 3, wherein water is added proximate to one or more quiescent zones or a classifier.

5. The aqueous composition of claim 3, wherein the screen is located above one or more grinding zone to reduce the viscosity of the aqueous composition comprising microfibrillated cellulose.

6. An essentially completely dried product obtainable by treating the aqueous suspension of claim 1 to remove about 100% by volume of the water to form an essentially completely dried product.

7. The essentially completely dried product of claim 6, wherein treating comprises gravity or vacuum-assisted drainage.

8. The essentially completely dried product of claim 6, wherein treating is performed with or without pressing, or evaporation, or filtration, or a combination thereof.

9. A method of preparing a papermaking composition comprising rehydrating the essentially completely dried product of claim 6 and incorporating the rehydrated product in a papermaking composition.

10. An essentially completely dried product obtainable by treating the aqueous suspension of claim 2 to remove about 100% by volume of the water to form an essentially completely dried product.

11. The essentially completely dried product of claim 10, wherein treating comprises gravity or vacuum-assisted drainage.

12. The essentially completely dried product of claim 10, wherein treating is performed with or without pressing, or evaporation, or filtration, or a combination thereof.

* * * * *